(12) United States Patent
Tanaka

(10) Patent No.: US 11,381,270 B2
(45) Date of Patent: Jul. 5, 2022

(54) IN-VEHICLE TRANSMISSION SYSTEM

(71) Applicant: Sumitomo Electric Industries, Ltd., Osaka (JP)

(72) Inventor: Yuya Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/288,119

(22) PCT Filed: Dec. 23, 2019

(86) PCT No.: PCT/JP2019/050239
§ 371 (c)(1),
(2) Date: Apr. 23, 2021

(87) PCT Pub. No.: WO2020/137929
PCT Pub. Date: Jul. 2, 2020

(65) Prior Publication Data
US 2021/0384935 A1   Dec. 9, 2021

(30) Foreign Application Priority Data
Dec. 25, 2018 (JP) .............................. JP2018-241058

(51) Int. Cl.
*H04B 1/3822*   (2015.01)
(52) U.S. Cl.
CPC ................................ *H04B 1/3822* (2013.01)
(58) Field of Classification Search
CPC ......... H04B 1/3822; H04B 1/18; H04L 67/12; B60K 31/18; B60Y 2200/30

USPC ........................................................ 455/90.1
See application file for complete search history.

(56) References Cited

U.S. PATENT DOCUMENTS

| | | | | |
|---|---|---|---|---|
| 5,083,134 A | * | 1/1992 | Saitou | H01Q 1/1271 343/704 |
| 5,654,720 A | * | 8/1997 | Saitou | H01Q 1/1271 343/704 |
| 5,905,468 A | * | 5/1999 | Ikawa | H01Q 1/1278 343/704 |

(Continued)

FOREIGN PATENT DOCUMENTS

| | | |
|---|---|---|
| JP | 10-79615 A | 3/1998 |
| JP | 2009-177785 A | 8/2009 |

(Continued)

*Primary Examiner* — Hai V Nguyen
(74) *Attorney, Agent, or Firm* — Xsensus LLP

(57) ABSTRACT

An on-vehicle transmission system includes: a path part configured to transmit a radio signal received from the antenna side, to the on-vehicle-device side; an on-vehicle-device-side circuit unit including a plurality of wireless circuits configured to receive radio signals in frequency bands different from each other; and a power supply circuit configured to supply power from the on-vehicle-device side to a circuit on the antenna side via the path part. The plurality of wireless circuits are connected in series via a transmission line configured to transmit a radio signal, and are respectively connected to the plurality of on-vehicle devices via the transmission line configured to transmit a radio signal. The on-vehicle-device-side circuit unit splits the radio signal received from the path part and provides resultant radio signals to the respective wireless circuits.

10 Claims, 15 Drawing Sheets

(56) References Cited

U.S. PATENT DOCUMENTS

| | | | | |
|---|---|---|---|---|
| 6,072,435 A * | 6/2000 | Terashima | | H01Q 1/1271 343/704 |
| 6,201,505 B1 * | 3/2001 | Terashima | | H01Q 1/1278 343/860 |
| 6,243,043 B1 * | 6/2001 | Terashima | | H01Q 1/1271 343/704 |
| 6,522,027 B1 * | 2/2003 | Morillon | | G07C 9/00309 307/10.6 |
| 6,522,241 B1 * | 2/2003 | Baudard | | B60R 25/04 340/426.36 |
| 6,700,475 B1 * | 3/2004 | Geber | | G07C 9/00309 455/343.1 |
| 6,906,612 B2 * | 6/2005 | Ghabra | | G07C 9/00309 340/5.72 |
| 7,211,768 B2 * | 5/2007 | Yamashita | | H05B 3/84 343/714 |
| 7,689,198 B2 * | 3/2010 | Deng | | H04B 1/207 381/23 |
| 7,825,865 B2 * | 11/2010 | Ibe | | H01Q 9/42 343/713 |
| 7,907,083 B2 * | 3/2011 | Sakamoto | | G01S 13/345 342/147 |
| 8,204,040 B2 * | 6/2012 | Iseda | | H04W 72/0433 370/351 |
| 8,270,537 B2 * | 9/2012 | Tsutsui | | H03F 3/191 343/745 |
| 8,310,338 B2 * | 11/2012 | Hamada | | B60R 25/245 340/5.6 |
| 9,378,603 B2 * | 6/2016 | Seino | | G07C 9/00309 |
| 10,271,265 B2 * | 4/2019 | Breaux, III | | G06F 9/546 |
| 10,805,068 B1 * | 10/2020 | Leise | | G07C 5/006 |
| 10,832,214 B1 * | 11/2020 | Leise | | G07C 5/006 |
| 10,839,015 B1 * | 11/2020 | Leise | | H04L 9/0637 |
| 10,868,867 B2 * | 12/2020 | Binder | | H04L 67/12 |
| 10,930,089 B1 * | 2/2021 | Leise | | G07C 5/0816 |
| 10,986,622 B2 * | 4/2021 | Zhang | | H04L 5/0053 |
| 11,037,246 B1 * | 6/2021 | Leise | | G06Q 40/025 |
| 11,108,225 B2 * | 8/2021 | Fisher | | H02M 7/003 |
| 11,128,710 B2 * | 9/2021 | Binder | | H04L 67/12 |
| 11,178,272 B2 * | 11/2021 | Breaux | | H04M 1/72454 |
| 11,190,590 B2 * | 11/2021 | Binder | | H04L 67/12 |
| 11,240,311 B2 * | 2/2022 | Binder | | H04L 67/12 |
| 11,245,765 B2 * | 2/2022 | Binder | | H04L 67/12 |
| 2002/0142803 A1 * | 10/2002 | Yamamoto | | H04M 1/6091 455/557 |
| 2003/0038733 A1 * | 2/2003 | Willats | | G07C 9/00182 340/13.24 |
| 2003/0193388 A1 * | 10/2003 | Ghabra | | G07C 9/00309 340/5.61 |
| 2007/0139157 A1 * | 6/2007 | Inaba | | G07C 9/00309 455/67.11 |
| 2007/0197187 A1 * | 8/2007 | Deng | | H04B 1/202 455/345 |
| 2007/0257841 A1 * | 11/2007 | Hermann | | G01S 5/02 342/417 |
| 2009/0153295 A1 * | 6/2009 | Hamada | | G07C 9/00309 340/5.64 |
| 2009/0245196 A1 * | 10/2009 | Iseda | | H04W 72/0433 370/329 |
| 2009/0245425 A1 * | 10/2009 | Tsutsui | | H01Q 1/1271 343/860 |
| 2010/0073216 A1 * | 3/2010 | Sakamoto | | G01S 13/42 342/146 |
| 2011/0291111 A1 * | 12/2011 | Nagai | | H01L 23/10 257/676 |
| 2013/0201316 A1 * | 8/2013 | Binder | | H04L 67/12 701/2 |
| 2015/0145646 A1 * | 5/2015 | Seino | | G07C 9/00309 340/5.61 |
| 2015/0240459 A1 * | 8/2015 | Kawasaki | | E02F 9/267 701/50 |
| 2017/0078400 A1 * | 3/2017 | Binder | | H04L 67/12 |
| 2017/0331899 A1 * | 11/2017 | Binder | | H04L 67/12 |
| 2018/0034912 A1 * | 2/2018 | Binder | | H04L 67/12 |
| 2018/0070291 A1 * | 3/2018 | Breaux | | H04W 4/40 |
| 2018/0124181 A1 * | 5/2018 | Binder | | H04L 67/12 |
| 2018/0278693 A1 * | 9/2018 | Binder | | H04L 67/12 |
| 2018/0278694 A1 * | 9/2018 | Binder | | H04L 67/12 |
| 2018/0343304 A1 * | 11/2018 | Binder | | H04L 67/12 |
| 2018/0375940 A1 * | 12/2018 | Binder | | H04L 67/12 |
| 2019/0039466 A1 * | 2/2019 | Jung | | H02J 50/60 |
| 2019/0052747 A1 * | 2/2019 | Breaux | | H04M 1/72463 |
| 2019/0098090 A1 * | 3/2019 | Binder | | H04L 67/12 |
| 2019/0109904 A1 * | 4/2019 | Binder | | H04L 67/12 |
| 2019/0174449 A1 * | 6/2019 | Shan | | H04W 60/00 |
| 2019/0174466 A1 * | 6/2019 | Zhang | | H04L 5/005 |
| 2019/0281587 A1 * | 9/2019 | Zhang | | H04W 72/042 |
| 2019/0281588 A1 * | 9/2019 | Zhang | | H04L 5/0051 |
| 2020/0079237 A1 * | 3/2020 | Seong | | B60L 53/38 |
| 2020/0130529 A1 * | 4/2020 | Seong | | B60L 53/66 |
| 2020/0194996 A1 * | 6/2020 | Fisher | | H05K 7/2089 |
| 2020/0204965 A1 * | 6/2020 | Chano | | H04W 72/005 |
| 2020/0274929 A1 * | 8/2020 | Binder | | H04L 67/12 |
| 2020/0280607 A1 * | 9/2020 | Binder | | H04L 67/12 |
| 2020/0295975 A1 * | 9/2020 | Li | | G06N 3/0454 |
| 2021/0042361 A1 * | 2/2021 | Leise | | G06Q 40/08 |
| 2021/0075860 A1 * | 3/2021 | Binder | | H04L 67/12 |
| 2021/0075861 A1 * | 3/2021 | Binder | | H04L 67/12 |
| 2021/0184455 A9 * | 6/2021 | Fisher | | H02H 3/087 |
| 2021/0195388 A1 * | 6/2021 | Miyagawa | | H04W 72/0453 |
| 2021/0234670 A1 * | 7/2021 | Leise | | H04L 9/0637 |
| 2021/0297199 A1 * | 9/2021 | Miao | | H04B 7/063 |
| 2021/0312405 A1 * | 10/2021 | Leise | | H04L 9/30 |
| 2021/0312543 A1 * | 10/2021 | Leise | | G06Q 10/10 |
| 2021/0370870 A1 * | 12/2021 | Furuta | | H04Q 9/00 |
| 2021/0385276 A1 * | 12/2021 | Binder | | H04L 67/12 |
| 2021/0385277 A1 * | 12/2021 | Binder | | H04L 67/12 |
| 2021/0385278 A1 * | 12/2021 | Binder | | H04L 67/12 |
| 2022/0012780 A1 * | 1/2022 | Leise | | H04L 9/0637 |
| 2022/0053081 A1 * | 2/2022 | Breaux, III | | G06K 9/0053 |
| 2022/0078241 A1 * | 3/2022 | Binder | | H04L 67/12 |
| 2022/0078242 A1 * | 3/2022 | Binder | | H04L 67/12 |
| 2022/0078243 A1 * | 3/2022 | Binder | | H04L 67/12 |
| 2022/0095235 A1 * | 3/2022 | Zhang | | H04W 72/0406 |

FOREIGN PATENT DOCUMENTS

| | | |
|---|---|---|
| JP | 2009-246685 A | 10/2009 |
| JP | 2010-34980 A | 2/2010 |

* cited by examiner

IN-VEHICLE TRANSMISSION SYSTEM

CROSS-REFERENCE TO RELATED APPLICATIONS

The present application is based on PCT filing PCT/JP2019/050239, filed Dec. 23, 2019, which claims priority to JP 2018-241058, filed on Dec. 25, 2018, the entire contents of each are incorporated herein by reference.

TECHNICAL FIELD

The present invention relates to an on-vehicle transmission system.

BACKGROUND ART

PATENT LITERATURE 1 (Japanese Laid-Open Patent Publication No. 2009-177785) discloses the following technology. Specifically, an on-vehicle wireless communication apparatus includes a plurality of antennas having different frequencies, a multiplexing circuit, a demultiplexing circuit, and a plurality of wireless devices corresponding to the plurality of antennas having different frequencies. The plurality of antennas are connected to one of the multiplexing circuit and the demultiplexing circuit, and further installed on any of the roof, an upper portion of the windshield, and an upper portion of the rear glass of a vehicle together with the connected multiplexing circuit or demultiplexing circuit, the plurality of wireless devices are connected to the other of the demultiplexing circuit and the multiplexing circuit to which the antennas are not connected, by a wireless device-side antenna cable, and the multiplexing circuit and the demultiplexing circuit are connected to each other by an antenna device-side antenna cable routed through the inside of a pillar.

CITATION LIST

Patent Literature

PATENT LITERATURE 1: Japanese Laid-Open Patent Publication No. 2009-177785

SUMMARY OF INVENTION

An on-vehicle transmission system of the present disclosure is mounted on a vehicle including one or a plurality of antennas and a plurality of on-vehicle devices. The on-vehicle transmission system includes: a path part configured to transmit a radio signal (Radio Frequency Signal) received from the antenna side to the on-vehicle-device side; an on-vehicle-device-side circuit unit including a plurality of wireless circuits configured to receive radio signals in frequency bands different from each other; and a power supply circuit configured to supply power from the on-vehicle-device side to a circuit on the antenna side via the path part. The plurality of wireless circuits are connected in series via a transmission line configured to transmit a radio signal, and are respectively connected to the plurality of on-vehicle devices via the transmission line configured to transmit a radio signal. The on-vehicle-device-side circuit unit splits the radio signal received from the path part and provides resultant radio signals to the respective wireless circuits. The power supply circuit superimposes power on the transmission line, in a portion, in the transmission line, that is on a side opposite to the path part with respect to the wireless circuit that is nearest to the path part.

An on-vehicle transmission system of the present disclosure is mounted on a vehicle including a plurality of antennas and one or a plurality of on-vehicle devices. The on-vehicle transmission system includes: a path part configured to transmit a radio signal received from the antenna side, to the on-vehicle-device side; an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side. The plurality of wireless circuits are connected in series via a transmission line configured to transmit a radio signal, and are respectively connected to the plurality of antennas via the transmission line configured to transmit a radio signal. The antenna-side circuit unit combines the radio signals received by the respective wireless circuits and outputs a resultant radio signal to the path part. The power supply circuit obtains power from the transmission line, in a portion, in the transmission line, that is on a side opposite to the path part with respect to the wireless circuit that is nearest to the path part.

An on-vehicle transmission system of the present disclosure is mounted on a vehicle including one or a plurality of antennas and a plurality of on-vehicle devices. The on-vehicle transmission system includes: a path part configured to transmit a radio signal received from the antenna side, to the on-vehicle-device side; an on-vehicle-device-side circuit unit including a plurality of wireless circuits configured to receive radio signals in frequency bands different from each other; and a power supply circuit configured to supply power from the on-vehicle-device side to a circuit on the antenna side via the path part. The plurality of wireless circuits are connected in series via transmission lines each configured to transmit a radio signal, and are respectively connected to the plurality of on-vehicle devices via the transmission lines each configured to transmit a radio signal. The on-vehicle-device-side circuit unit splits the radio signal received from the path part and provides resultant radio signals to the respective wireless circuits. The plurality of wireless circuits include one or a plurality of single-line circuits which are each a wireless circuit configured to receive a radio signal from one of the transmission lines, and one or a plurality of multi-line circuits which are each a wireless circuit configured to receive radio signals from a plurality of the transmission lines. The power supply circuit superimposes power on a transmission line different from a transmission line having a largest number of the single-line circuits connected thereto among the transmission lines.

An on-vehicle transmission system of the present disclosure is mounted on a vehicle including a plurality of antennas and one or a plurality of on-vehicle devices. The on-vehicle transmission system includes: a path part configured to transmit a radio signal received from the antenna side, to the on-vehicle-device side; an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side. The plurality of wireless circuits are connected in series via transmission lines each configured to transmit a radio signal, and are respectively connected to the plurality of antennas via the transmission lines each configured to transmit a radio signal. The antenna-side circuit unit combines the radio signals received by the respective wireless circuits and outputs a resultant radio signal to the path part. The plurality of wireless circuits include one or a plurality of single-line circuits which are each a wireless circuit configured to receive a radio signal via one antenna and to output the received radio signal to one of the transmission lines, and one or a plurality of multi-line circuits which are each a wireless circuit configured to receive radio signals via a plurality of antennas and to output the received radio signals to a plurality of the transmission lines. The power supply circuit obtains power from a transmission line different from a transmission line having a largest number of the single-line circuits connected thereto among the transmission lines.

One mode of the present disclosure can be realized as a semiconductor integrated circuit that realizes a part or the entirety of the on-vehicle transmission system.

DESCRIPTION OF EMBODIMENTS

Figure 1:
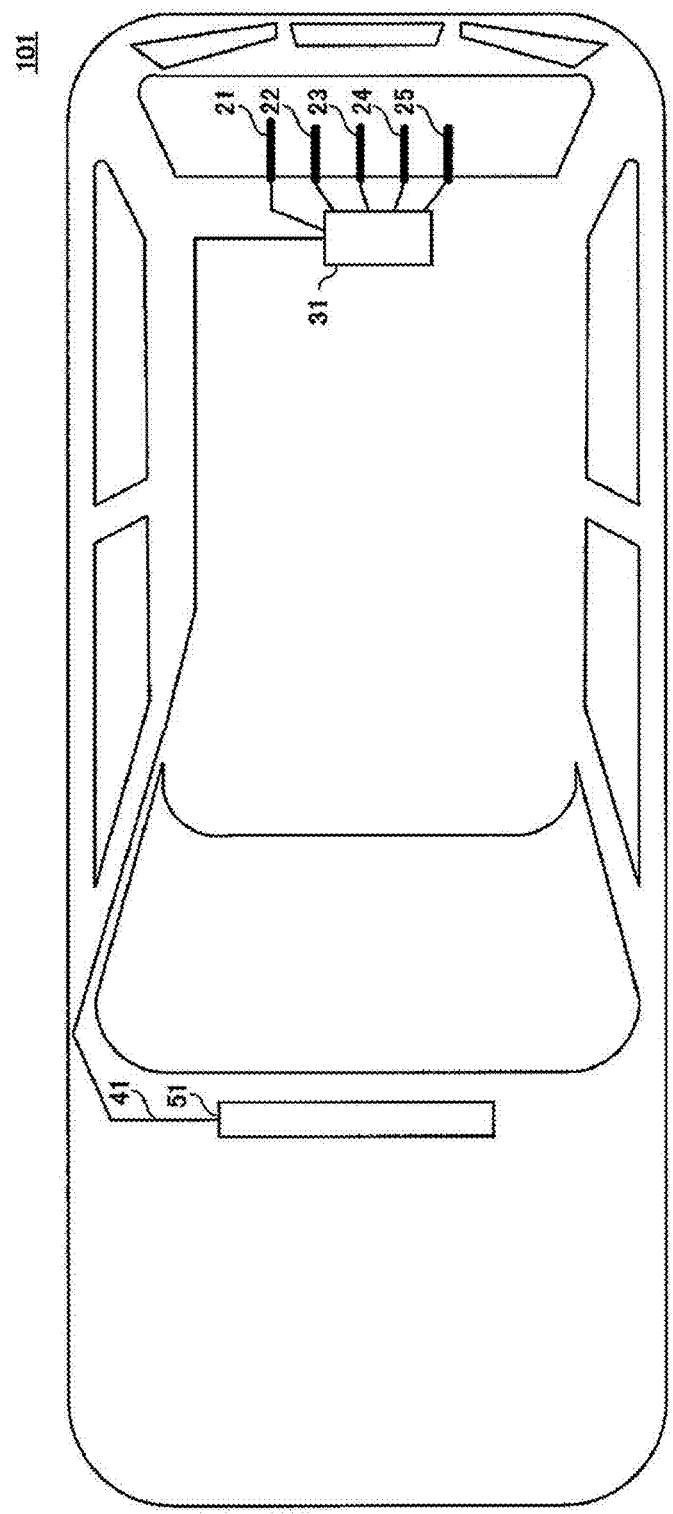
FIG. 1 shows an example of a configuration of an on-vehicle transmission system according to a first embodiment of the present disclosure.

Problems to be Solved by the Present Disclosure

A technology capable of supplying power from the on-vehicle-device side to the antenna-side at low cost and in a simple configuration is desired beyond the technology described in PATENT LITERATURE 1.

The present disclosure has been made in order to solve the above-described problem. An object of the present disclosure is to provide an on-vehicle transmission system capable of supplying, in a configuration in which a radio signal is transmitted between an antenna side and an on-vehicle-device side of a vehicle, power from the on-vehicle-device side to the antenna side at low cost and in a simple configuration.

Effects of the Present Disclosure

According to the present disclosure, in a configuration in which a radio signal is transmitted between an antenna side and an on-vehicle-device side of a vehicle, power can be supplied from the on-vehicle-device side to the antenna side at low cost and in a simple configuration.

Description of Embodiments of the Present Disclosure

First, contents of embodiments of the present disclosure are listed and described.

(1) An on-vehicle transmission system according to an embodiment of the present disclosure is mounted on a vehicle including one or a plurality of antennas and a plurality of on-vehicle devices. The on-vehicle transmission system includes: a path part configured to transmit a radio signal received from the antenna side, to the on-vehicle-device side; an on-vehicle-device-side circuit unit including a plurality of wireless circuits configured to receive radio signals in frequency bands different from each other; and a power supply circuit configured to supply power from the on-vehicle-device side to a circuit on the antenna side via the path part. The plurality of wireless circuits are connected in series via a transmission line configured to transmit a radio signal, and are respectively connected to the plurality of on-vehicle devices via the transmission line configured to transmit a radio signal. The on-vehicle-device-side circuit unit splits the radio signal received from the path part and provides resultant radio signals to the respective wireless circuits. The power supply circuit superimposes power on the transmission line, in a portion, in the transmission line, that is on a side opposite to the path part with respect to the wireless circuit that is nearest to the path part.

Due to the configuration in which power is supplied to the antenna side by using the transmission line, simplification of the power supply path from the on-vehicle-device side to the antenna side can be realized. Due to the configuration in which the position at which the power supply circuit superimposes power on the transmission line is set to a position farther from the path part, the number of the types of the radio signals to be filtered in the power supply circuit can be reduced. Thus, the configuration of the power supply circuit can be simplified. Therefore, in a configuration in which a radio signal is transmitted between the antenna side and the on-vehicle-device side of the vehicle, power can be supplied from the on-vehicle-device side to the antenna side at low cost and in a simple configuration.

(2) Preferably, the power supply circuit superimposes power on the transmission line, in a portion, in the transmission line, that is on a side opposite to the path part with respect to the wireless circuit that is farthest from the path part.

Due to the configuration in which the position at which the power supply circuit superimposes power on the transmission line is set to a position still farther from the path part with respect to the wireless circuit farthest from the path part, the number of the types of the radio signals to be filtered in the power supply circuit can be reduced to one, for example. Therefore, the configuration of the power supply circuit can be more simplified.

(3) Preferably, each wireless circuit includes a filter configured to filter a radio signal received from the transmission line, and a DC frequency component is included in a passband of the filter.

Due to this configuration, a DC voltage can be supplied to the antenna side in a simple configuration by using the transmission line, from a position via the wireless circuit.

(4) Preferably, in the on-vehicle-device-side circuit unit, each wireless circuit for which the frequency band of the radio signal to be received is lower is connected at a side closer to the path part.

Due to this configuration, a radio signal in a higher frequency band can be set as the radio signal to be filtered in the power supply circuit. Therefore, the configuration of the power supply circuit can be simplified.

(5) An on-vehicle transmission system according to an embodiment of the present disclosure is mounted on a vehicle including a plurality of antennas and one or a plurality of on-vehicle devices. The on-vehicle transmission system includes: a path part configured to transmit a radio signal received from the antenna side, to the on-vehicle-device side; an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side. The plurality of wireless circuits are connected in series via a transmission line configured to transmit a radio signal, and are respectively connected to the plurality of antennas via the transmission line configured to transmit a radio signal. The antenna-side circuit unit combines the radio signals received by the respective wireless circuits and outputs a resultant radio signal to the path part. The power supply circuit obtains power from the transmission line, in a portion, in the transmission line, that is on a side opposite to the path part with respect to the wireless circuit that is nearest to the path part.

Due to the configuration in which power is obtained from the transmission line on the antenna side, simplification of the power supply path from the on-vehicle-device side to the antenna side can be realized. Due to the configuration in which the position at which the power supply circuit obtains power from the transmission line is set to a position farther from the path part, the number of the types of the radio signals to be filtered in the power supply circuit can be reduced. Thus, the configuration of the power supply circuit can be simplified. Therefore, in a configuration in which a radio signal is transmitted between the antenna side and the on-vehicle-device side of the vehicle, power can be supplied from the on-vehicle-device side to the antenna side at low cost and in a simple configuration.

(6) Preferably, the power supply circuit obtains power from the transmission line, in a portion, in the transmission line, that is on a side opposite to the path part with respect to the wireless circuit that is farthest from the path part.

Due to the configuration in which the position at which the power supply circuit obtains power from the transmission line is set to a position still farther from the path part with respect to the wireless circuit farthest from the path part, the number of the types of the radio signals to be filtered in the power supply circuit can be reduced to one, for example. Therefore, the configuration of the power supply circuit can be more simplified.

(7) Preferably, each wireless circuit includes a filter configured to filter a radio signal received from the transmission line, and a DC frequency component is included in a passband of the filter.

Due to this configuration, a DC voltage can be obtained in a simple configuration from the transmission line, at a position via the wireless circuit.

(8) Preferably, in the antenna-side circuit unit, each wireless circuit for which the frequency band of the radio signal to be received is lower is connected at a side closer to the path part.

Due to this configuration, a radio signal in a higher frequency band can be set as the radio signal to be filtered in the power supply circuit. Therefore, the configuration of the power supply circuit can be simplified.

(9) An on-vehicle transmission system according to an embodiment of the present disclosure is mounted on a vehicle including one or a plurality of antennas and a plurality of on-vehicle devices. The on-vehicle transmission system includes: a path part configured to transmit a radio signal received from the antenna side, to the on-vehicle-device side; an on-vehicle-device-side circuit unit including a plurality of wireless circuits configured to receive radio signals in frequency bands different from each other; and a power supply circuit configured to supply power from the on-vehicle-device side to a circuit on the antenna side via the path part. The plurality of wireless circuits are connected in series via transmission lines each configured to transmit a radio signal, and are respectively connected to the plurality of on-vehicle devices via the transmission lines each configured to transmit a radio signal. The on-vehicle-device-side circuit unit splits the radio signal received from the path part and provides resultant radio signals to the respective wireless circuits. The plurality of wireless circuits include one or a plurality of single-line circuits which are each a wireless circuit configured to receive a radio signal from one of the transmission lines, and one or a plurality of multi-line circuits which are each a wireless circuit configured to receive radio signals from a plurality of the transmission lines. The power supply circuit superimposes power on a transmission line different from a transmission line having a largest number of the single-line circuits connected thereto among the transmission lines.

When compared with the types of the radio signals transmitted via a transmission line having a largest number of single-line circuits connected thereto, the types of the radio signals transmitted via another transmission line different from the transmission line is small in number. As described above, the transmission line on which the power supply circuit superimposes power is set to a transmission line different from the transmission line having a largest number of single-line circuits connected thereto. Due to this configuration, the number of the types of the radio signals to be filtered in the power supply circuit can be reduced. Thus, the configuration of the power supply circuit can be simplified. Therefore, in a configuration in which a radio signal is transmitted between the antenna side and the on-vehicle-device side of the vehicle, power can be supplied from the on-vehicle-device side to the antenna side at low cost and in a simple configuration.

(10) An on-vehicle transmission system according to an embodiment of the present disclosure is mounted on a vehicle including a plurality of antennas and one or a plurality of on-vehicle devices. The on-vehicle transmission system includes: a path part configured to transmit a radio signal received from the antenna side, to the on-vehicle-device side; an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side. The plurality of wireless circuits are connected in series via transmission lines each configured to transmit a radio signal, and are respectively connected to the plurality of antennas via the transmission lines each configured to transmit a radio signal. The antenna-side circuit unit combines the radio signals received by the respective wireless circuits and outputs a resultant radio signal to the path part. The plurality of wireless circuits include one or a plurality of single-line circuits which are each a wireless circuit configured to receive a radio signal via one antenna and to output the received radio signal to one of the transmission lines, and one or a plurality of multi-line circuits which are each a wireless circuit configured to receive radio signals via a plurality of antennas and to output the received radio signals to a plurality of the transmission lines. The power supply circuit obtains power from a transmission line different from a transmission line having a largest number of the single-line circuits connected thereto among the transmission lines.

When compared with the types of the radio signals transmitted via a transmission line having a largest number of single-line circuits connected thereto, the types of the radio signals transmitted via another transmission line different from the transmission line is small in number. As described above, the transmission line on which the power supply circuit superimposes power is set to a transmission line different from the transmission line having a largest number of single-line circuits connected thereto. Due to this configuration, the number of the types of the radio signals to be filtered in the power supply circuit can be reduced. Thus, the configuration of the power supply circuit can be simplified. Therefore, in a configuration in which a radio signal is transmitted between the antenna side and the on-vehicle-device side of the vehicle, power can be supplied from the on-vehicle-device side to the antenna side at low cost and in a simple configuration.

Hereinafter, embodiments of the present disclosure will be described with reference to the drawings. In the drawings, the same or corresponding parts are denoted by the same reference signs, and the descriptions thereof are not repeated. At least some parts of the embodiments described below can be combined together as desired.

First Embodiment

FIG. 1 shows an example of a configuration of an on-vehicle transmission system according to a first embodiment of the present disclosure.

With reference to FIG. 1, an on-vehicle transmission system 101 is mounted on a vehicle and includes antennas 21 to 25, an antenna-side circuit unit 31, a path part 41, an on-vehicle-device-side circuit unit 51, and a plurality of on-vehicle devices (not shown). Hereinafter, each of the antennas 21 to 25 is also referred to as an antenna 20.

The antennas 21 to 25 are provided so as to correspond to communication services different from each other.

In Japan, various communication services are assigned frequency bands different from each other. For example, AM radio is assigned 526.5 kHz to 1606.5 kHz; shortwave radio is assigned 3.3775 MHz to 15.260 MHz; FM radio is assigned 76 MHz to 108 MHz; television broadcasting is assigned 470 MHz to 710 MHz; ITS radio is assigned 755 MHz to 765 MHz; GPS is assigned 1176.45 MHz, 1227.60 MHz, 1278.75 MHz, and 1563.4 MHz to 1578.4 MHz; wireless LAN of 2.4 GHz band is assigned 2400 MHz to 2483.5 MHz; wireless LAN of 5 GHz band is assigned 5150 MHz to 5725 MHz; and ETC is assigned 5770 MHz to 5850 MHz.

In addition, mobile communication such as 3G and LTE (Long Term Evolution) is assigned a plurality of frequency bands. Specifically, the frequency bands are 718 MHz to 748 MHz, 815 MHz to 845 MHz, 860 MHz to 890 MHz, 900 MHz to 915 MHz, 945 MHz to 960 MHz, 1427.9 MHz to 1462.9 MHz, 1475.9 MHz to 1510.9 MHz, 1749.9 MHz to 1784.9 MHz, 1844.9 MHz to 1879.9 MHz, 1920 MHz to 1980 MHz, 2110 MHz to 2170 MHz, and 3600 MHz to 4380 MHz.

Each antenna 21 to 25 can receive a radio signal in a frequency band to which a corresponding communication service is assigned.

Hereinafter, as an example of the antennas 20, it is assumed that the antenna 21 corresponds to wireless LAN of 5 GHz band, the antenna 22 corresponds to wireless LAN of 2.4 GHz band, the antenna 23 corresponds to GPS, the antenna 24 corresponds to LTE of 700 MHz band, and the antenna 25 corresponds to AM radio.

In the on-vehicle transmission system 101, the antennas 20 are, for example, installed on the rear glass of the vehicle, or installed in the vehicle while being collectively housed in one housing, as a shark antenna.

The antenna-side circuit unit 31 is installed, for example, in the space between a sheet metal and a lining in a rear part of the roof of the vehicle.

The path part 41 is installed, for example, through the inside of a right front pillar of the vehicle.

The on-vehicle-device-side circuit unit 51 is installed, for example, in the space in a dashboard at a front part of the vehicle.

The antenna-side circuit unit 31 combines radio signals in different communication services, in other words, radio signals in different media, that is, radio signals in frequency bands different from each other, that are received via the antennas 20, and outputs the resultant radio signal to the path part 41.

The on-vehicle-device-side circuit unit 51 splits the radio signal resulting from the combination and received from the antenna-side circuit unit 31 via the path part 41, separates the resultant radio signals for the respective communication services, and outputs a plurality of separated radio signals to a plurality of on-vehicle devices (not shown), respectively.

Hereinafter, each component on the antenna-side circuit unit 31 side with respect to the path part 41 in the on-vehicle transmission system 101 is also referred to as an "antenna side". Each component on the on-vehicle-device-side circuit unit 51 side with respect to the path part 41 in the on-vehicle transmission system 101 is also referred to as an "on-vehicle-device side".

The path part 41 transmits a radio signal received from the antenna side to an on-vehicle-device-side mounted on the vehicle. More specifically, the path part 41 includes an antenna cable, and transmits, to the on-vehicle-device-side circuit unit 51, the radio signal resulting from the combination and received from the antenna-side circuit unit 31.

The on-vehicle-device-side circuit unit 51 receives a radio signal transmitted from each on-vehicle device, combines the received radio signals, and outputs the resultant radio signal to the path part 41.

The path part 41 transmits, to the antenna-side circuit unit 31, the radio signal resulting from the combination and received from the on-vehicle-device-side circuit unit 51. Then, the antenna-side circuit unit 31 splits the radio signal resulting from the combination and received from the path part 41, separates the resultant radio signals for the respective communication services, and transmits a plurality of separated radio signals to the outside of the vehicle via the corresponding antennas 20.

[Problem]

Meanwhile, in some cases, an active element that needs power is provided on the antenna side in the on-vehicle transmission system 101. For example, there is a case where an LNA (Low Noise Amplifier), which is an active element, is provided in order to amplify a radio signal received via an antenna.

Then, it is conceivable that, as a means for supplying power to a circuit such as an LNA on the antenna side, a power supply circuit is provided on the on-vehicle-device side, and power is superimposed on a transmission line on the on-vehicle-device side by the power supply circuit, thereby supplying power to the antenna side via the path part.

However, as in the on-vehicle transmission system 101 shown in FIG. 1, in a configuration in which the path part 41 transmits radio signals in a plurality of frequency bands different from each other, filter configuration for the power supply circuit becomes complicated when trying to reduce, for example: decrease in the SN (Signal Noise) ratio of a radio signal due to flowing of a radio signal from the transmission line on the on-vehicle-device side into the power supply circuit and flowing of noise from the power supply circuit into the transmission line; deterioration of characteristics of the power supply circuit due to a radio signal from the transmission line on the on-vehicle-device side; and the like.

Therefore, in the on-vehicle transmission system 101 according to the first embodiment of the present disclosure, the above problem is solved by the following configurations and operations.

[On-Vehicle-Device-Side Circuit Unit]

Figure 2:
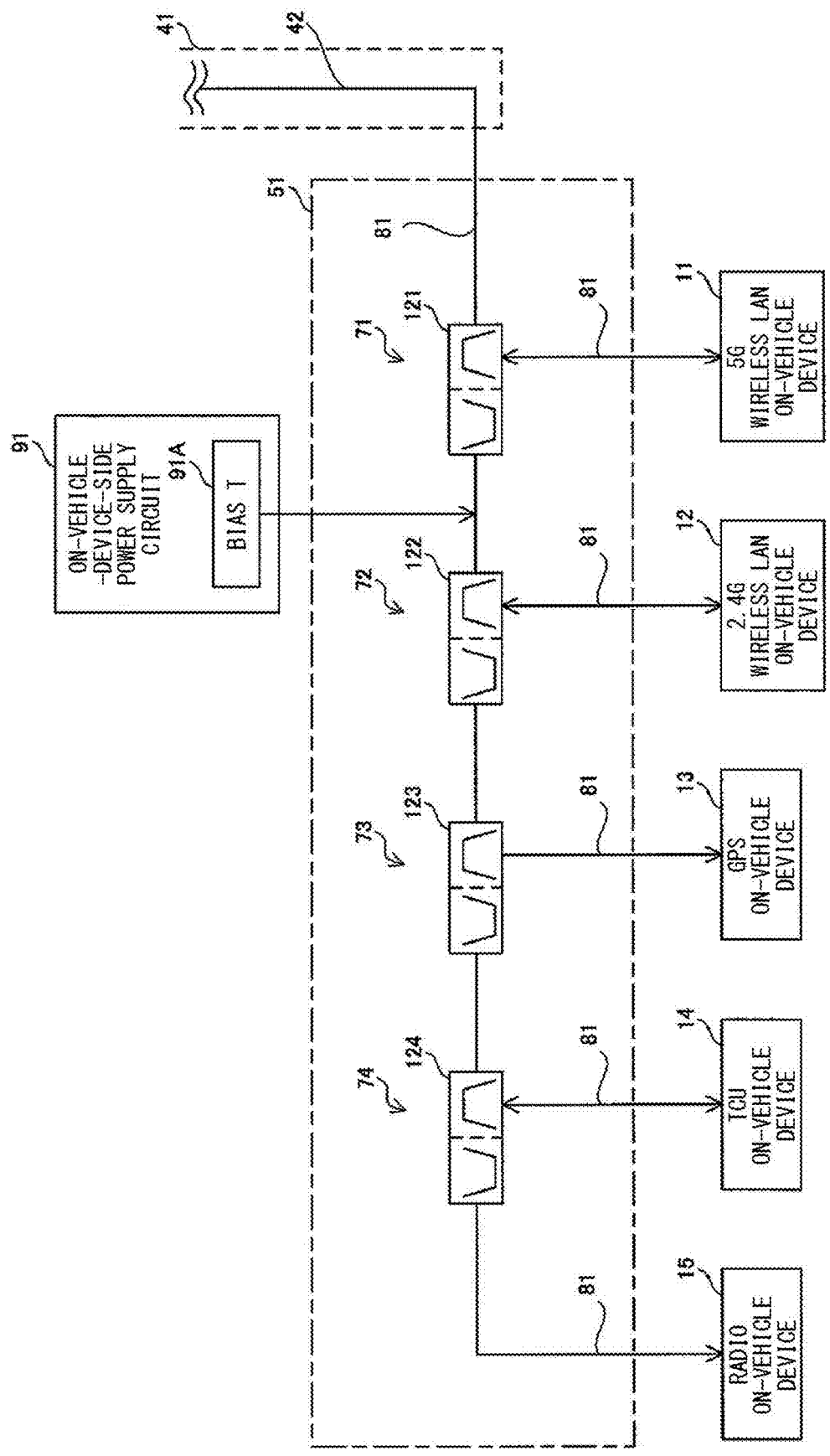
FIG. 2 shows an example of a configuration of an on-vehicle-device side in the on-vehicle transmission system according to the first embodiment of the present disclosure.

FIG. 2 shows an example of a configuration of the on-vehicle-device side in the on-vehicle transmission system according to the first embodiment of the present disclosure.

With reference to FIG. 2, the on-vehicle transmission system 101 includes the on-vehicle-device-side circuit unit 51 on the on-vehicle-device side. The on-vehicle transmission system 101 includes, as the on-vehicle devices: a 5G wireless LAN on-vehicle device 11 corresponding to wireless LAN of 5 GHz band; a 2.4G wireless LAN on-vehicle device 12 corresponding to wireless LAN of 2.4 GHz band; a GPS on-vehicle device 13 corresponding to GPS, such as a car navigation device; a TCU on-vehicle device 14 which is a TCU (Telematics Communication Unit) using LTE in 700 MHz band; and a radio on-vehicle device 15 corresponding to AM/FM radio, such as a radio tuner.

The on-vehicle transmission system 101 includes a transmission line 81 which connects circuit elements on the on-vehicle-device side. The path part 41 includes a transmission line 42. The transmission line 42 is an antenna cable, for example.

An end portion of the transmission line 81 is connected to the transmission line 42 in the path part 41. Accordingly, the on-vehicle-device-side circuit unit 51 receives a radio signal from the path part 41, and outputs a radio signal to the path part 41. The transmission line 81 and the transmission line 42 may be an integrated transmission line.

The on-vehicle-device-side circuit unit 51 includes wireless circuits 71 to 74 which receive radio signals in frequency bands different from each other. The wireless circuits 71 to 74 are connected in series, that is, subordinately connected. In other words, the wireless circuits 71 to 74 are connected in cascade.

More specifically, the wireless circuit 71, the wireless circuit 72, the wireless circuit 73, and the wireless circuit 74 are connected to each other in this order from the path part 41 side via the transmission line 81. Hereinafter, each of the wireless circuits 71 to 74 is also referred to as a wireless circuit 70.

Each wireless circuit 70 is connected, via the transmission line 81, to an on-vehicle device capable of providing a service that uses a radio signal in a corresponding frequency band.

For example, the wireless circuit 71 is connected to the 5G wireless LAN on-vehicle device 11, the wireless circuit 72 is connected to the 2.4G wireless LAN on-vehicle device 12, the wireless circuit 73 is connected to the GPS on-vehicle device 13, and the wireless circuit 74 is connected to the TCU on-vehicle device 14 and the radio on-vehicle device 15.

For example, the wireless circuits 71, 72, 74 are wireless transmission/reception circuits, and the wireless circuit 73 is a wireless reception circuit.

Each wireless circuit 70 may be mounted on a printed circuit board of about 30 mm×30 mm per circuit, for example, and each printed circuit board is connected via the transmission line 81, for example.

Some or all of the respective wireless circuits 70 may be mounted on one printed circuit board.

The on-vehicle-device-side circuit unit 51 splits a radio signal received from the path part 41 and provides the resultant radio signals to the respective wireless circuits 70.

More specifically, the wireless circuits 71 to 74 respectively include diplexers 121 to 124 which filter the radio signals received from the transmission line 81. That is, the wireless circuits 71 to 74 respectively include the diplexers 121 to 124 which function as filters that each separate the radio signal in the transmission line 81. For example, the diplexers 121 to 124 are connected in series via the transmission line 81. As an example, the diplexers 121 to 124 are implemented by band-pass filters and band-rejection filters. Hereinafter, each of the diplexers 121 to 124 is also referred to as a diplexer 120.

For example, a DC frequency component is included in the passband of each of the diplexers 121 to 124 of the respective wireless circuits 71 to 74.

The diplexer 121 in the wireless circuit 71 receives a radio signal obtained by combining a plurality of frequency components, from the path part 41, and separates a frequency component in a signal band including 5.2 GHz to 5.6 GHz that is a radio signal corresponding to wireless LAN of 5 GHz band. The diplexer 121 outputs the separated radio signal to the 5G wireless LAN on-vehicle device 11. The diplexer 121 outputs, to the wireless circuit 72, a radio signal including frequency components other than the frequency component in the signal band including 5.2 GHz to 5.6 GHz, in the radio signal received from the path part 41.

Meanwhile, the diplexer 121 outputs a radio signal received from the 5G wireless LAN on-vehicle device 11, to the path part 41. The diplexer 121 outputs a radio signal received from the wireless circuit 72, to the path part 41. The diplexer 121 combines the radio signal received from the 5G wireless LAN on-vehicle device 11 and the radio signal received from the wireless circuit 72, and outputs the resultant radio signal to the path part 41.

The diplexer 122 in the wireless circuit 72 receives a radio signal obtained by combining a plurality of frequency components, from the wireless circuit 71, and separates a frequency component in a signal band including 2.4 GHz that is a radio signal corresponding to wireless LAN of 2.4 GHz band. The diplexer 122 outputs the separated radio signal to the 2.4G wireless LAN on-vehicle device 12. The diplexer 122 outputs, to the wireless circuit 73, a radio signal including frequency components other than the frequency component in the signal band including 2.4 GHz, in the radio signal received from the wireless circuit 71.

Meanwhile, the diplexer 122 outputs a radio signal received from the 2.4G wireless LAN on-vehicle device 12, to the wireless circuit 71. The diplexer 122 outputs a radio signal received from the wireless circuit 73, to the wireless circuit 71. The diplexer 122 combines the radio signal received from the 2.4G wireless LAN on-vehicle device 12 and the radio signal received from the wireless circuit 73, and outputs the resultant radio signal to the wireless circuit 71.

The diplexer 123 in the wireless circuit 73 receives a radio signal obtained by combining a plurality of frequency components, from the wireless circuit 72, and separates a frequency component in a signal band including 1.2 GHz to 1.6 GHz that is a radio signal corresponding to GPS. The diplexer 123 outputs the separated radio signal to the GPS on-vehicle device 13. The diplexer 123 outputs, to the wireless circuit 74, a radio signal including frequency components other than the frequency component in the signal band including 1.2 GHz to 1.6 GHz, in the radio signal received from the wireless circuit 72.

Meanwhile, the diplexer 123 outputs a radio signal received from the wireless circuit 74, to the wireless circuit 72.

The diplexer 124 in the wireless circuit 74 receives a radio signal obtained by combining a plurality of frequency components, from the wireless circuit 73, and separates a frequency component in a signal band including 700 MHz that is a radio signal corresponding to TCU. The diplexer 124 outputs the separated radio signal to the TCU on-vehicle device 14. The diplexer 124 outputs, to the radio on-vehicle device 15, a radio signal that includes frequency components other than the frequency component in the signal band including 700 MHz and that includes a frequency component in a signal band including 1 MHz that is a radio signal corresponding to AM radio, in the radio signal received from the wireless circuit 73.

Meanwhile, the diplexer 124 outputs a radio signal received from the TCU on-vehicle device 14, to the wireless circuit 73.

[Power Supply Circuit on On-Vehicle-Device Side]

The on-vehicle-device-side circuit unit 51 further includes an on-vehicle-device-side power supply circuit 91. The on-vehicle-device-side power supply circuit 91 includes a bias T 91A, for example.

The on-vehicle-device-side power supply circuit 91 supplies power to each circuit on the on-vehicle-device side, and supplies power from the on-vehicle-device side to the antenna side via the path part 41. The on-vehicle-device-side power supply circuit 91 superimposes power on the transmission line 81, in a portion, in the transmission line 81 provided on the on-vehicle-device side, that is on the side opposite to the path part 41 with respect to the wireless circuit 71 which is the wireless circuit 70 nearest to the path part 41. For example, the on-vehicle-device-side power supply circuit 91 is connected to the transmission line 81 and superimposes power on the transmission line 81 via the bias T 91A.

The bias T 91A includes passive elements such as a coil and a capacitor. The bias T 91A superimposes a DC voltage on the transmission line 81 while suppressing decrease in the S/N ratio of the radio signal, deterioration of characteristics of the on-vehicle-device-side power supply circuit 91 due to the radio signal from the transmission line 81, and the like.

For example, in the example shown in FIG. 2, the output port of the bias T 91A is connected to a portion between the wireless circuit 71 and the wireless circuit 72 in the transmission line 81, and a DC voltage generated in the on-vehicle-device-side power supply circuit 91 is outputted to the transmission line 81 at this portion.

Figure 3:
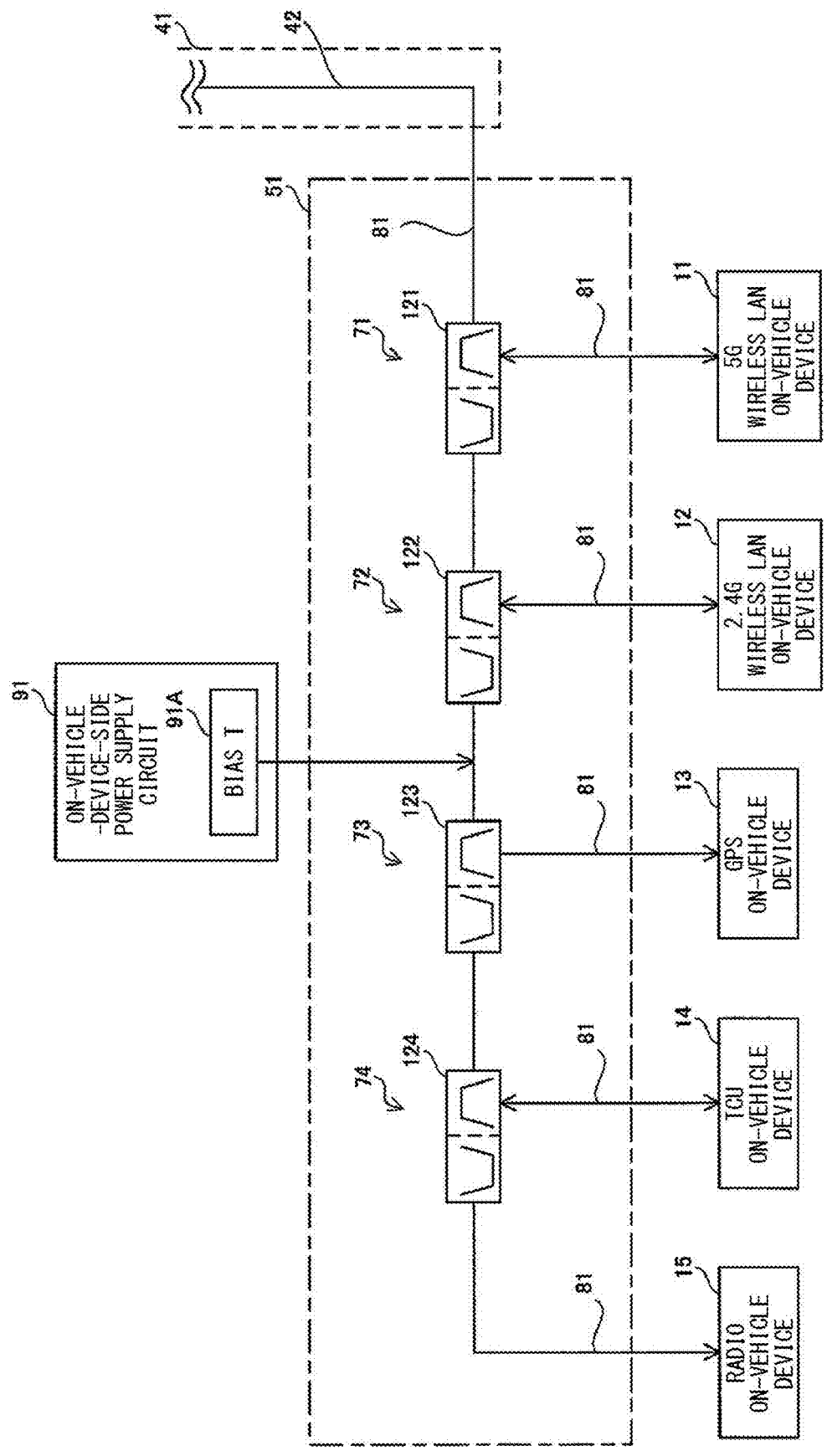
FIG. 3 shows another example of a configuration of the on-vehicle-device side in the on-vehicle transmission system according to the first embodiment of the present disclosure.

FIG. 3 shows another example of a configuration of the on-vehicle-device side in the on-vehicle transmission system according to the first embodiment of the present disclosure.

In the example shown in FIG. 3, the output port of the bias T 91A is connected to a portion between the wireless circuit 72 and the wireless circuit 73 in the transmission line 81, and a DC voltage generated in the on-vehicle-device-side power supply circuit 91 is outputted to the transmission line 81 at this portion.

Figure 4:
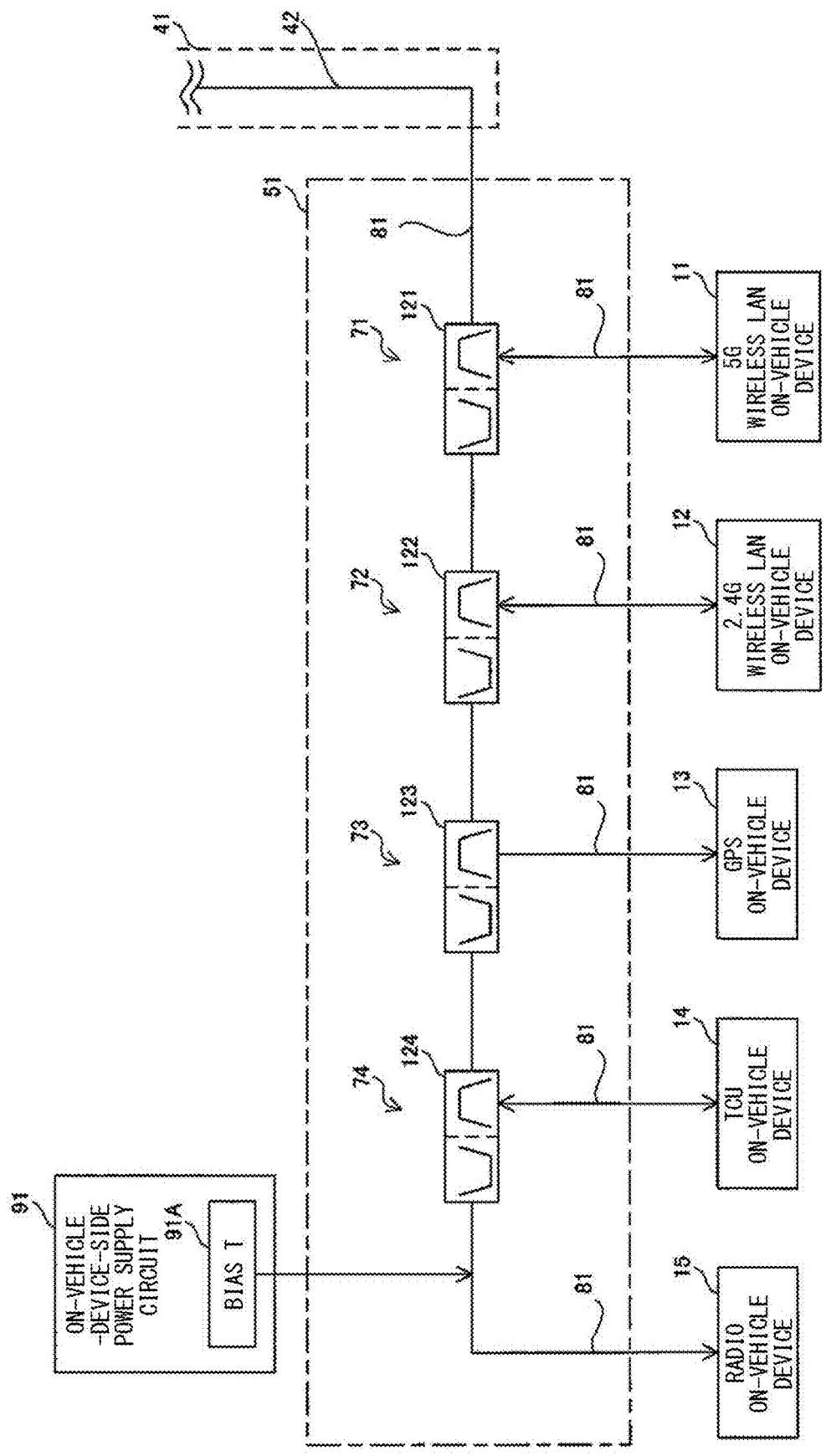
FIG. 4 shows another example of a configuration of the on-vehicle-device side in the on-vehicle transmission system according to the first embodiment of the present disclosure.

FIG. 4 shows another example of a configuration of the on-vehicle-device side in the on-vehicle transmission system according to the first embodiment of the present disclosure.

The on-vehicle-device-side power supply circuit 91 superimposes power on the transmission line 81, in a portion, in the transmission line 81 provided on the on-vehicle-device side, that is on the side opposite to the path part 41 with respect to the wireless circuit 74 which is the wireless circuit 70 farthest from the path part 41.

Specifically, as shown in FIG. 4, the output port of the bias T 91A is connected to a portion between the wireless circuit 74 and the radio on-vehicle device 15 in the transmission line 81, and a DC voltage generated in the on-vehicle-device-side power supply circuit 91 is outputted to the transmission line 81 at this portion.

[Antenna-Side Circuit Unit]

Figure 5:
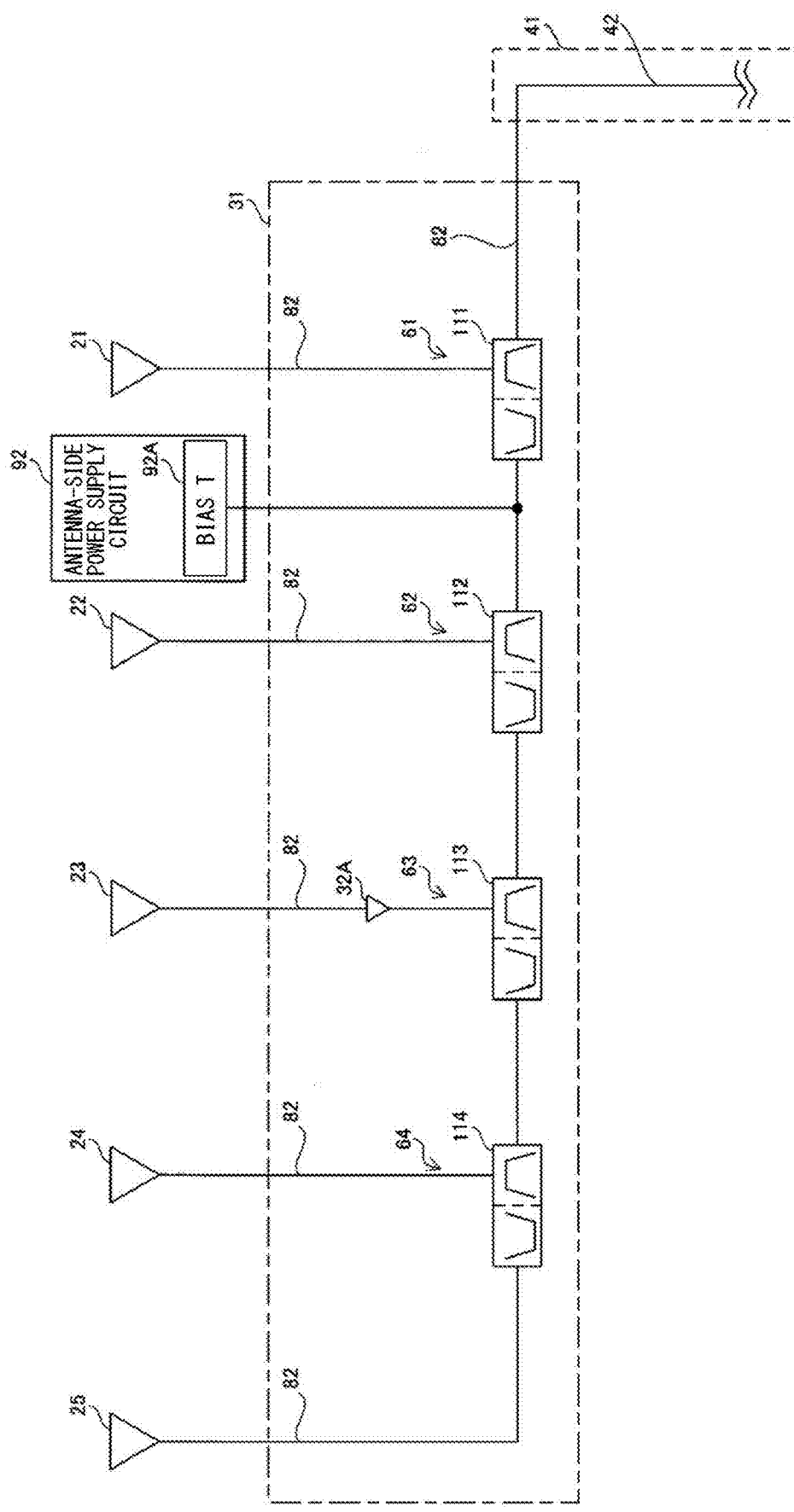
FIG. 5 shows an example of a configuration of an antenna side in the on-vehicle transmission system according to the first embodiment of the present disclosure.

FIG. 5 shows an example of a configuration of the antenna side in the on-vehicle transmission system according to the first embodiment of the present disclosure.

With reference to FIG. 5, the on-vehicle transmission system 101 includes a transmission line 82 which connects circuit elements on the antenna side.

An end portion of the transmission line 82 is connected to the transmission line 42 in the path part 41. Accordingly, the antenna-side circuit unit 31 receives a radio signal from the path part 41, and outputs a radio signal to the path part 41.

The transmission line 82 and the transmission line 42 may be an integrated transmission line.

The antenna-side circuit unit 31 includes wireless circuits 61 to 64 which receive radio signals in frequency bands different from each other. The wireless circuits 61 to 64 are connected in series, that is, subordinately connected. In other words, the wireless circuits 61 to 64 are connected in cascade.

More specifically, the wireless circuit 61, the wireless circuit 62, the wireless circuit 63, and the wireless circuit 64 are connected to each other in this order from the path part 41 side via the transmission line 82. Hereinafter, each of the wireless circuits 61 to 64 is also referred to as a wireless circuit 60.

Each wireless circuit 60 is connected, via the transmission line 82, to an antenna capable of receiving a radio signal in a corresponding frequency band.

For example, the wireless circuit 61 is connected to the antenna 21, the wireless circuit 62 is connected to the antenna 22, the wireless circuit 63 is connected to the antenna 23, and the wireless circuit 64 is connected to the antenna 24 and the antenna 25.

For example, the wireless circuits 61, 62, 64 are wireless transmission/reception circuits, and the wireless circuit 63 is a wireless reception circuit.

Each wireless circuit 60 may be mounted on a printed circuit board of about 30 mm×30 mm per circuit, for example, and each printed circuit board is connected via the transmission line 82, for example.

Some or all of the respective wireless circuits 60 may be mounted on one printed circuit board.

The antenna-side circuit unit 31 combines radio signals received by the respective wireless circuits 60, and outputs the resultant radio signal to the path part 41.

More specifically, the wireless circuits 61 to 64 respectively include diplexers 111 to 114 which filter the radio signals received from the transmission line 82. That is, the wireless circuits 61 to 64 respectively include the diplexers 111 to 114 which each combine radio signals in the transmission line 82. The diplexers 111 to 114 also function as filters that each separate the radio signal in the transmission line 82. For example, the diplexers 111 to 114 are connected in series via the transmission line 82. As an example, the diplexers 111 to 114 are implemented by band-pass filters and band-rejection filters. Hereinafter, each of the diplexers 111 to 114 is also referred to as a diplexer 110.

For example, a DC frequency component is included in the passband of each of the diplexers 111 to 114 of the respective wireless circuits 61 to 64.

The diplexer 111 in the wireless circuit 61 receives a radio signal received at the antenna 21 and corresponding to wireless LAN of 5 GHz band, and outputs the received radio signal to the path part 41. The diplexer 111 outputs a radio signal received from the wireless circuit 62, to the path part 41. The diplexer 111 combines the radio signal received at the antenna 21 and corresponding to wireless LAN of 5 GHz band and the radio signal received from the wireless circuit 62, and outputs the resultant radio signal to the path part 41.

Meanwhile, the diplexer 111 separates a frequency component in the signal band including 5.2 GHz to 5.6 GHz that is a radio signal corresponding to wireless LAN of 5 GHz band, from the radio signal received from the path part 41. The diplexer 111 outputs the separated radio signal to the antenna 21. The diplexer 111 outputs, to the wireless circuit 62, a radio signal including frequency components outside the signal band including 5.2 GHz to 5.6 GHz, in the radio signal received from the path part 41.

The diplexer 112 in the wireless circuit 62 receives a radio signal received at the antenna 22 and corresponding to wireless LAN of 2.4 GHz band, and outputs the received radio signal to the wireless circuit 61. The diplexer 112 outputs a radio signal received from the wireless circuit 63, to the wireless circuit 61. The diplexer 112 combines the radio signal received at the antenna 22 and corresponding to wireless LAN of 2.4 GHz band and the radio signal received from the wireless circuit 63, and outputs the resultant radio signal to the wireless circuit 61.

Meanwhile, the diplexer 112 separates a frequency component in the signal band including 2.4 GHz that is a radio signal corresponding to wireless LAN of 2.4 GHz band, from the radio signal received from the wireless circuit 61. The diplexer 112 outputs the separated radio signal to the antenna 22. The diplexer 112 outputs, to the wireless circuit 63, a radio signal including frequency components outside the signal band including 2.4 GHz, in the radio signal received from the wireless circuit 61.

The diplexer 113 in the wireless circuit 63 receives a radio signal received at the antenna 23 and corresponding to GPS, and outputs the received radio signal to the wireless circuit 62. The diplexer 113 outputs a radio signal received from the wireless circuit 64, to the wireless circuit 62. The diplexer 113 combines the radio signal received at the antenna 23 and corresponding to GPS and the radio signal received from the wireless circuit 64, and outputs the resultant radio signal to the wireless circuit 62.

Meanwhile, the diplexer 113 outputs a radio signal received from the wireless circuit 62, to the wireless circuit 64.

The antenna-side circuit unit 31 includes an LNA 32A which is connected between the diplexer 113 and the antenna 23 and which amplifies the radio signal received at the antenna 23.

The diplexer 114 in the wireless circuit 64 receives a radio signal received at the antenna 24 and corresponding to LTE in 700 MHz band, and outputs the received radio signal, to the wireless circuit 63. The diplexer 114 receives a radio signal received at the antenna 25 and corresponding to AM radio, and outputs the received radio signal, to the wireless circuit 63. The diplexer 114 combines the radio signal received at the antenna 24 and corresponding to LTE in 700 MHz band and the radio signal received at the antenna 25 and corresponding to AM radio, and outputs the resultant radio signal to the wireless circuit 63.

Meanwhile, the diplexer 114 separates a frequency component in the signal band including 700 MHz that is a radio signal corresponding to LTE in 700 MHz band, from the radio signal received from the wireless circuit 63. The diplexer 114 outputs the separated radio signal, to the antenna 24.

[Power Supply Circuit on Antenna Side]

The antenna-side circuit unit 31 further includes an antenna-side power supply circuit 92. The antenna-side power supply circuit 92 includes a bias T 92A, for example.

The antenna-side power supply circuit 92 obtains power supplied from the on-vehicle-device side to the antenna side via the path part 41, and supplies the power to circuits on the antenna side. The antenna-side power supply circuit 92 obtains power from the transmission line 82, in a portion, in the transmission line 82 provided on the antenna side, that is on the side opposite to the path part 41 with respect to the wireless circuit 61 which is the wireless circuit 60 nearest to the path part 41. For example, the antenna-side power supply circuit 92 is connected to the transmission line 82 and obtains power from the transmission line 82 via the bias T 92A. The antenna-side power supply circuit 92 supplies the obtained power to each circuit on the antenna side.

The bias T 92A includes passive elements such as a coil and a capacitor. The bias T 92A obtains a DC voltage from the transmission line 82 while suppressing decrease in the S/N ratio of the radio signal, deterioration of characteristics of the antenna-side power supply circuit 92 due to the radio signal from the transmission line 81, and the like.

For example, in the example shown in FIG. 5, the input port of the bias T 92A is connected to a portion between the wireless circuit 61 and the wireless circuit 62 in the transmission line 82. The antenna-side power supply circuit 92 receives a DC voltage from the transmission line 82 at this portion.

Figure 6:
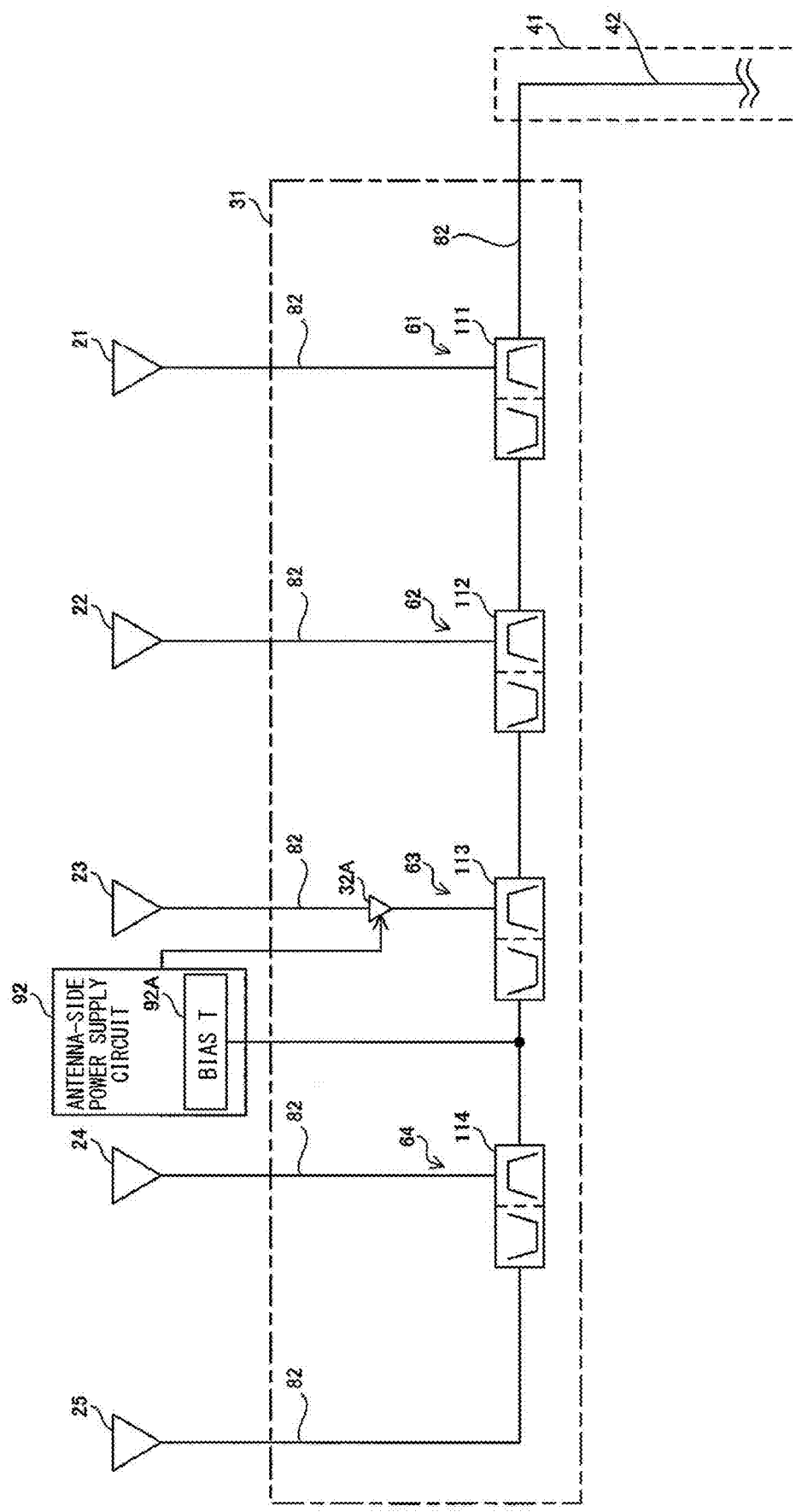
FIG. 6 shows another example of a configuration of the antenna side in the on-vehicle transmission system according to the first embodiment of the present disclosure.

FIG. 6 shows another example of a configuration of the antenna side in the on-vehicle transmission system according to the first embodiment of the present disclosure.

In the example shown in FIG. 6, the input port of the bias T 92A is connected to a portion between the wireless circuit 63 and the wireless circuit 64 in the transmission line 82. The antenna-side power supply circuit 92 receives a DC voltage from the transmission line 82 at this portion. For example, the antenna-side power supply circuit 92 is connected to the LNA 32A which is the circuit to be supplied with power, and supplies the LNA 32A with the DC voltage received from the transmission line 82 or a voltage obtained through conversion of the DC voltage.

Figure 7:
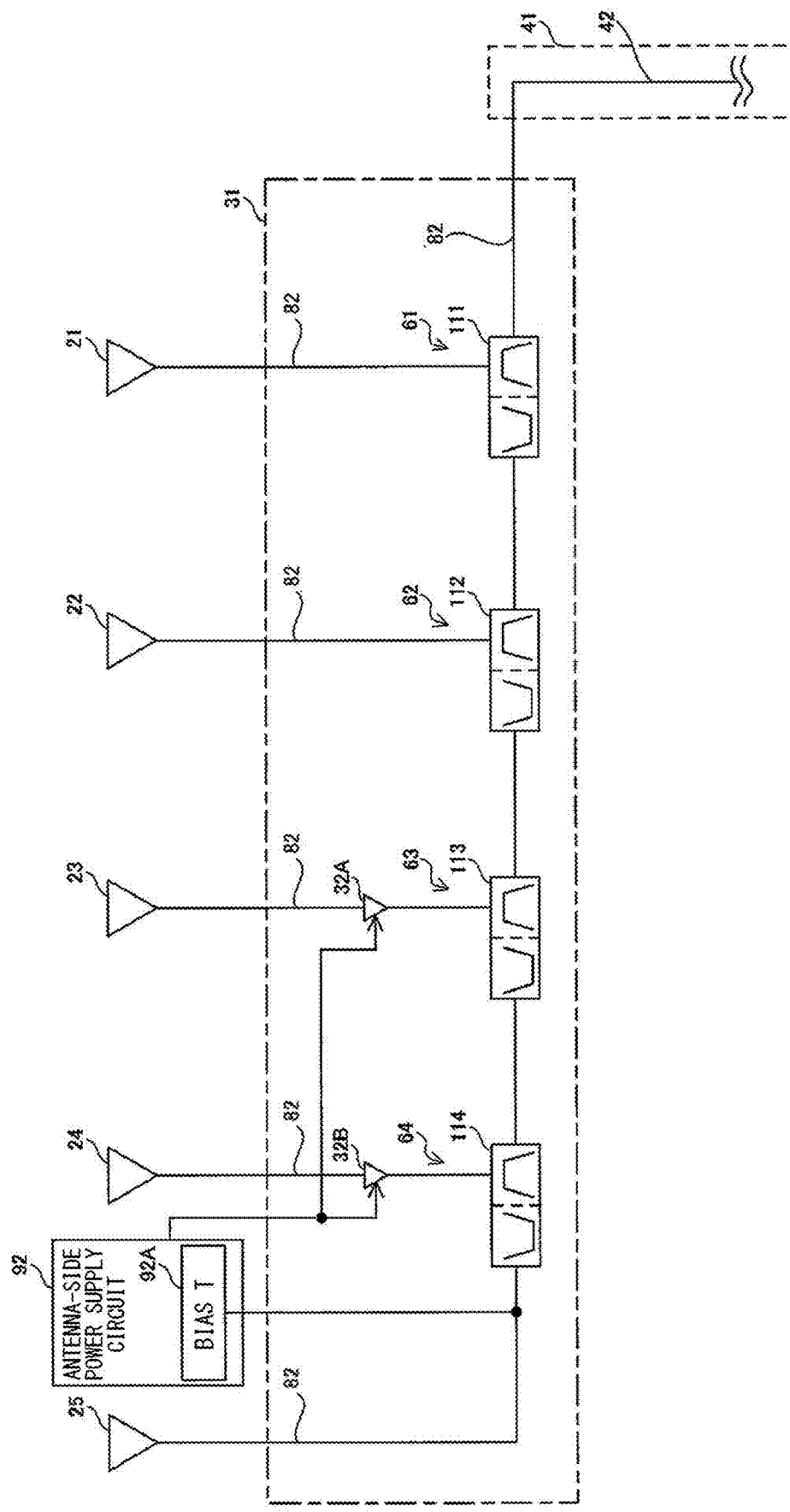
FIG. 7 shows another example of a configuration of the antenna side in the on-vehicle transmission system according to the first embodiment of the present disclosure.

FIG. 7 shows another example of a configuration of the antenna side in the on-vehicle transmission system according to the first embodiment of the present disclosure.

In the example shown in FIG. 7, the antenna-side circuit unit 31 further includes an LNA 32B which is connected between the diplexer 114 and the antenna 24 and which amplifies the radio signal received at the antenna 24.

The antenna-side power supply circuit 92 obtains power from the transmission line 82 in a portion, in the transmission line 82 provided on the antenna side, that is on the side opposite to the path part 41 with respect to the wireless circuit 64 which is the wireless circuit 60 farthest from the path part 41.

Specifically, as shown in FIG. 7, the input port of the bias T 92A is connected to a portion between the wireless circuit 64 and the antenna 25 in the transmission line 82. The antenna-side power supply circuit 92 receives a DC voltage from the transmission line 82 at this portion. The antenna-side power supply circuit 92 is connected to the LNA 32A and the LNA 32B which are the circuits to be supplied with power, and supplies the LNA 32A and the LNA 32B with the DC voltage received from the transmission line 82 or a voltage obtained through conversion of the DC voltage.

Although the on-vehicle transmission system 101 according to the first embodiment of the present disclosure includes the antenna-side circuit unit and the on-vehicle-device-side circuit unit, the present disclosure is not limited thereto. The on-vehicle transmission system 101 may include either one of the antenna-side circuit unit and the on-vehicle-device-side circuit unit. In this case, the path part 41 may form a part of the path between the antenna-side circuit unit and the on-vehicle-device-side circuit unit.

In the on-vehicle transmission system 101 according to the first embodiment of the present disclosure, the antenna-side circuit unit includes the wireless transmission/reception circuit and the wireless reception circuit. However, the present disclosure is not limited thereto. The antenna-side circuit unit may not necessarily include the wireless reception circuit. Specifically, the antenna-side circuit unit 31 may not necessarily include the wireless circuit 63 which is the wireless reception circuit.

In the on-vehicle transmission system 101 according to the first embodiment of the present disclosure, the on-vehicle-device-side circuit unit includes the wireless transmission/reception circuit and the wireless reception circuit. However, the present disclosure is not limited there to. The on-vehicle-device-side circuit unit may not necessarily include the wireless reception circuit. Specifically, the on-vehicle-device-side circuit unit 51 may not necessarily include the wireless circuit 73 which is the wireless reception circuit.

In the on-vehicle transmission system 101 according to the first embodiment of the present disclosure, the wireless circuit 71, the wireless circuit 72, the wireless circuit 73, and the wireless circuit 74 in the on-vehicle-device-side circuit unit 51 are connected in this order from the path part 41 side. However, the present disclosure is not limited thereto. The connection order of the wireless circuits 70 is not limited in particular, and can be arbitrarily determined from various viewpoints.

In the on-vehicle transmission system 101 according to the first embodiment of the present disclosure, the wireless circuit 61, the wireless circuit 62, the wireless circuit 63, and the wireless circuit 64 in the antenna-side circuit unit 31 are connected in this order from the path part 41 side. However, the present disclosure is not limited thereto. The connection order of the wireless circuits 60 is not limited in particular, and can be arbitrarily determined from various viewpoints.

In the on-vehicle transmission system 101 according to the first embodiment of the present disclosure, the bias T 91A is provided outside the on-vehicle-device-side circuit unit 51. However, the present disclosure is not limited thereto. In the on-vehicle transmission system 101, the bias T 91A may be included in the on-vehicle-device-side circuit unit 51 or may be included in a wireless circuit 70.

In the on-vehicle transmission system 101 according to the first embodiment of the present disclosure, the bias T 92A is provided outside the antenna-side circuit unit 31. However, the present disclosure is not limited thereto. In the on-vehicle transmission system 101, the bias T 92A may be included in the antenna-side circuit unit 31 or may be included in a wireless circuit 60.

The on-vehicle transmission system 101 according to the first embodiment of the present disclosure includes, as the on-vehicle devices on the on-vehicle-device side, five on-vehicle devices, i.e., the 5G wireless LAN on-vehicle device 11, the 2.4G wireless LAN on-vehicle device 12, the GPS on-vehicle device 13, the TCU on-vehicle device 14, and the radio on-vehicle device 15. However, the present disclosure is not limited thereto. The on-vehicle transmission system 101 may be configured to include another type of on-vehicle device, may be configured so as not to include some of the on-vehicle devices described above, or may be configured to include a plurality of, i.e., 4 or less or 6 or more, on-vehicle devices.

The on-vehicle transmission system 101 according to the first embodiment of the present disclosure includes, as the antennas 20, five antennas, i.e., the antenna 21 corresponding to wireless LAN in 5 GHz band, the antenna 22 corresponding to wireless LAN in 2.4 GHz band, the antenna 23 corresponding to GPS, the antenna 24 corresponding to LTE in 700 MHz band, and the antenna 25 corresponding to AM radio. However, the present disclosure is not limited thereto. The on-vehicle transmission system 101 may be configured to include an antenna corresponding to another type of communication service, may be configured so as not to include some of the antennas described above, or may be configured to include a plurality of, i.e., 4 or less or 6 or more, antennas.

In the on-vehicle transmission system 101 according to the first embodiment of the present disclosure, the on-vehicle-device-side power supply circuit 91 on the on-vehicle-device side superimposes a DC voltage on the transmission line 81, the antenna-side power supply circuit 92 on the antenna side receives the DC voltage from the transmission line 82, and a DC frequency component is included in the passband of each diplexer 110 and each diplexer 120. However, the present disclosure is limited thereto. In the on-vehicle transmission system 101, the on-vehicle-device-side power supply circuit 91 on the on-vehicle-device side may superimpose an AC voltage having a predetermined frequency on the transmission line 81, the antenna-side power supply circuit 92 on the antenna side receives the AC voltage from the transmission line 82, and the frequency may be included in the passband of the diplexer 110 and the diplexer 120.

Meanwhile, with respect to a configuration in which a radio signal is transmitted between the antenna side and the on-vehicle-device side of a vehicle, a technology capable of supplying power from the on-vehicle-device side to the antenna side at low cost and in a simple configuration is desired.

In this regard, the on-vehicle transmission system 101 according to the first embodiment of the present disclosure is mounted to a vehicle including one or a plurality of antennas and a plurality of on-vehicle devices. The path part 41 transmits a radio signal received from the antenna side, to the on-vehicle-device side. The on-vehicle-device-side circuit unit 51 includes a plurality of wireless circuits 70 which receive radio signals in frequency bands different from each other. The on-vehicle-device-side power supply circuit 91 supplies power from the on-vehicle-device side to circuits on the antenna side via the path part 41. The plurality of wireless circuits 70 are connected in series via the transmission line 81 which transmits a radio signal, and are respectively connected to a plurality of on-vehicle devices via the transmission line 81 which transmits a radio signal. The on-vehicle-device-side circuit unit 51 splits a radio signal received from the path part 41 and provides the resultant radio signals to the respective wireless circuits 70. The on-vehicle-device-side power supply circuit 91 superimposes power on the transmission line 81, in a portion, in the transmission line 81, that is on the side opposite to the path part 41 with respect to the wireless circuit 71 which is nearest to the path part 41.

In this manner, due to the configuration in which power is supplied to the antenna side by using the transmission line 81, simplification of the power supply path from the on-vehicle-device side to the antenna side can be realized. In addition, due to the configuration in which the position at which the on-vehicle-device-side power supply circuit 91 superimposes power on the transmission line 81 is set to a position farther from the path part 41, the number of the types of the radio signals to be filtered in the on-vehicle-device-side power supply circuit 91 can be reduced. Thus, the configuration of the on-vehicle-device-side power supply circuit 91 can be simplified.

Therefore, with respect to the on-vehicle transmission system 101 according to the first embodiment of the present disclosure, in a configuration in which a radio signal is transmitted between the antenna side and the on-vehicle-device side of a vehicle, power can be supplied from the on-vehicle-device side to the antenna side at low cost and in a simple configuration.

With respect to the on-vehicle transmission system 101 according to the first embodiment of the present disclosure, in the on-vehicle-device-side circuit unit 51, the on-vehicle-device-side power supply circuit 91 superimposes power to the transmission line 81, in a portion, in the transmission line 81, that is on the side opposite to the path part 41 with respect to the wireless circuit 74 which is farthest from the path part 41.

Due to the configuration in which the position at which the on-vehicle-device-side power supply circuit 91 superimposes power on the transmission line 81 is set to a position still farther from the path part 41 with respect to the wireless circuit 74 which is farthest from the path part 41, the number of the types of the radio signals to be filtered in the on-vehicle-device-side power supply circuit 91 can be reduced to one, for example. Therefore, the configuration of the on-vehicle-device-side power supply circuit 91 can be more simplified.

With respect to the on-vehicle transmission system 101 according to the first embodiment of the present disclosure, in the on-vehicle-device-side circuit unit 51, each wireless circuit 70 includes a diplexer 120 which filters a radio signal received from the transmission line 81. A DC frequency component is included in the passband of the diplexer 120.

Due to this configuration, a DC voltage can be supplied to the antenna side in a simple configuration using the transmission line 81, from a position via the wireless circuit 70.

The on-vehicle transmission system 101 according to the first embodiment of the present disclosure is mounted on the vehicle including a plurality of antennas and one or a plurality of on-vehicle devices. The path part 41 transmits a radio signal received from the antenna side, to the on-vehicle-device side. The antenna-side circuit unit 31 includes a plurality of wireless circuits 60 which receive radio signals in frequency bands different from each other. The antenna-side power supply circuit 92 obtains power supplied from the on-vehicle-device side via the path part 41, and supplies the received power to circuits on the antenna side. The plurality of wireless circuits 60 are connected in series via the transmission line 82 which transmits a radio signal, and are respectively connected to a plurality of antennas via the transmission line 82 which transmits a radio signal. The antenna-side circuit unit 31 combines radio signals received by the respective wireless circuits 60, and outputs the resultant signal to the path part 41. The antenna-side power supply circuit 92 obtains power from the transmission line 82, in a portion, in the transmission line 82, that is on the side opposite to the path part 41 with respect to the wireless circuit 61 which is nearest to the path part 41.

Due to the configuration in which power is obtained on the antenna side from the transmission line 82, simplification of the power supply path from the on-vehicle-device side to the antenna side can be realized. In addition, due to the configuration in which the position at which the antenna-side power supply circuit 92 obtains power from the transmission line 82 is set to a position farther from the path part 41, the number of the types of the radio signals to be filtered in the antenna-side power supply circuit 92 can be reduced. Therefore, the configuration of the antenna-side power supply circuit 92 can be simplified.

Therefore, with respect to the on-vehicle transmission system 101 according to the first embodiment of the present disclosure, in a configuration in which a radio signal is transmitted between the antenna side and the on-vehicledevice side of the vehicle, power can be supplied from the on-vehicle-device side to the antenna side at low cost and in a simple configuration.

With respect to the on-vehicle transmission system 101 according to the first embodiment of the present disclosure, in the antenna-side circuit unit 31, the antenna-side power supply circuit 92 obtains power from the transmission line 82, in a portion, in the transmission line 82, that is on the side opposite to the path part 41 with respect to the wireless circuit 64 which is farthest from the path part 41.

Due to the configuration in which the position at which the antenna-side power supply circuit 92 obtains power from the transmission line 82 is set to a position still farther from the path part 41 with respect to the wireless circuit 64 which is farthest from the path part 41, the number of the type of radio signals to be filtered in the antenna-side power supply circuit 92 can be reduced to one, for example. Therefore, the configuration of the antenna-side power supply circuit 92 can be more simplified.

With respect to the on-vehicle transmission system 101 according to the first embodiment of the present disclosure, in the antenna-side circuit unit 31, each wireless circuit 60 includes a diplexer 110 which filters a radio signal received from the transmission line 82. A DC frequency component is included in the passband of the diplexer 110.

Due to this configuration, a DC voltage can be obtained in a simple configuration from the transmission line 82, at a position via the wireless circuit 60.

Next, another embodiment of the present disclosure is described with reference to the drawings. In the drawings, the same or corresponding parts are denoted by the same reference signs, and the description thereof is not repeated.

Second Embodiment

The present embodiment relates to an on-vehicle transmission system 101 in which the connection order of wireless circuits in the antenna-side circuit unit and the on-vehicle-device-side circuit unit is different from that in the on-vehicle transmission system 101 according to the first embodiment. Other than the content described below, the on-vehicle transmission system 101 according to the present embodiment is the same as the on-vehicle transmission system 101 according to the first embodiment.

[On-Vehicle-Device-Side Circuit Unit]

Figure 8:
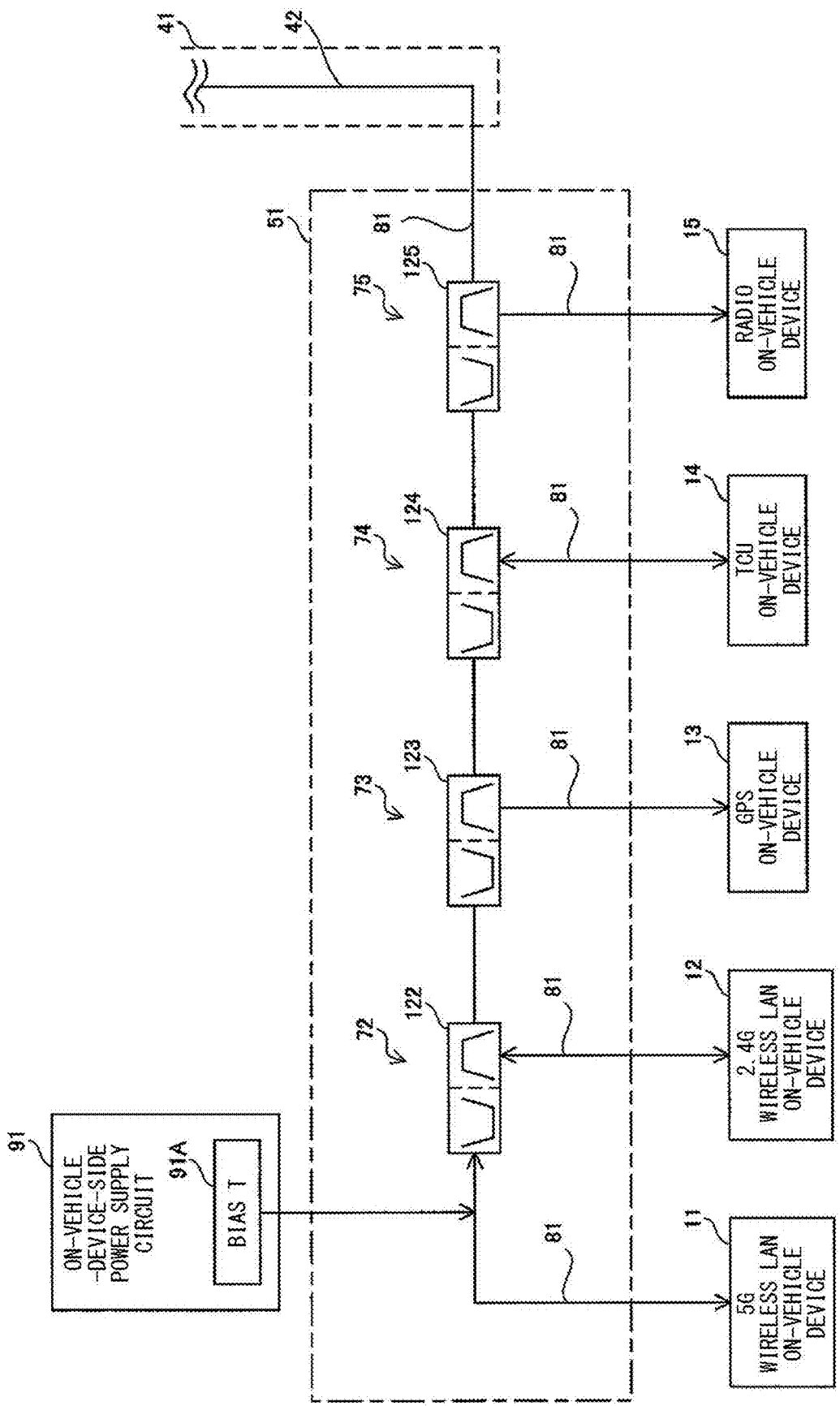
FIG. 8 shows an example of a configuration of the on-vehicle-device side in an on-vehicle transmission system according to a second embodiment of the present disclosure.

FIG. 8 shows an example of a configuration of the on-vehicle-device side in the on-vehicle transmission system according to a second embodiment of the present disclosure.

With reference to FIG. 8, the on-vehicle transmission system 101 includes a transmission line 81 which connects circuit elements on the on-vehicle-device side.

The on-vehicle-device-side circuit unit 51 includes wireless circuits 72 to 75 which receive radio signals in frequency bands different from each other. The wireless circuits 72 to 75 are connected in series, that is, subordinately connected. In the on-vehicle-device-side circuit unit 51, the wireless circuit 72 to 75 for which the frequency band of the radio signal to be received is lower is connected at a side closer to the path part 41.

More specifically, the wireless circuit 75, the wireless circuit 74, the wireless circuit 73, and the wireless circuit 72 are connected to each other in this order from the path part 41 side via the transmission line 81. Hereinafter, in the description of the present embodiment, each of the wireless circuits 72 to 75 is also referred to as a wireless circuit 70.

Each wireless circuit 70 is connected, via the transmission line 81, to an on-vehicle device capable of providing a service that uses a radio signal in a corresponding frequency band.

For example, the wireless circuit 75 is connected to the radio on-vehicle device 15, the wireless circuit 74 is connected to the TCU on-vehicle device 14, the wireless circuit 73 is connected to the GPS on-vehicle device 13, and the wireless circuit 72 is connected to the 2.4G wireless LAN on-vehicle device 12 and the 5G wireless LAN on-vehicle device 11.

The wireless circuits 72 to 75 respectively include diplexers 122 to 125 which function as filters that each separate the radio signal in transmission line 81. For example, the diplexers 122 to 125 are connected in series via the transmission line 81. As an example, the diplexers 122 to 125 are implemented by band-pass filters and band-rejection filters.

For example, a DC frequency component is included in the passband of each of the diplexers 122 to 125 which are filters of the respective wireless circuits 72 to 75.

The diplexer 125 in the wireless circuit 75 receives a radio signal obtained by combining a plurality of frequency components, from the path part 41, and separates a frequency component in a signal band including 1 MHz that is a radio signal corresponding to AM radio. The diplexer 125 outputs the separated radio signal to the radio on-vehicle device 15. The diplexer 125 outputs, to the wireless circuit 74, a radio signal including frequency components other than the frequency component in the signal band including 1 MHz, in the radio signal received from the path part 41.

Meanwhile, the diplexer 125 outputs a radio signal received from the wireless circuit 74, to the path part 41.

The diplexer 124 in the wireless circuit 74 receives a radio signal obtained by combining a plurality of frequency components, from the wireless circuit 75, and separates a frequency component in a signal band including 700 MHz that is a radio signal corresponding to TCU. The diplexer 124 outputs the separated radio signal to the TCU on-vehicle device 14. The diplexer 124 outputs, to the wireless circuit 73, a radio signal including frequency components other than the frequency component in the signal band including 700 MHz, in the radio signal received from the wireless circuit 75.

Meanwhile, the diplexer 124 outputs a radio signal received from the TCU on-vehicle device 14, to the wireless circuit 75. The diplexer 124 outputs a radio signal received from the wireless circuit 73, to the wireless circuit 75. The diplexer 124 combines the radio signal received from the TCU on-vehicle device 14 and the radio signal received from the wireless circuit 73, and outputs the resultant radio signal to the wireless circuit 75.

The diplexer 123 in the wireless circuit 73 receives a radio signal obtained by combining a plurality of frequency components, from the wireless circuit 74, and separates a frequency component in a signal band including 1.2 GHz to 1.6 GHz that is a radio signal corresponding to GPS. The diplexer 123 outputs the separated radio signal to the GPS on-vehicle device 13. The diplexer 123 outputs, to the wireless circuit 72, a radio signal including frequency components other than the frequency component in the signal band including 1.2 GHz to 1.6 GHz, in the radio signal received from the wireless circuit 74.

Meanwhile, the diplexer 123 outputs a radio signal received from the wireless circuit 72, to the wireless circuit 74.

The diplexer 122 in the wireless circuit 72 receives a radio signal obtained by combining a plurality of frequency components, from the wireless circuit 73, and separates a frequency component in a signal band including 2.4 GHz that is a radio signal corresponding to wireless LAN in 2.4 GHz band. The diplexer 122 outputs the separated radio signal to the 2.4G wireless LAN on-vehicle device 12. The diplexer 122 outputs, to the 5G wireless LAN on-vehicle device 11, a radio signal that includes frequency components other than the frequency component in the signal band including 2.4 GHz and that includes a frequency component in a signal band including 5.2 GHz to 5.6 GHz that is a radio signal corresponding to wireless LAN in 5 GHz band, in the radio signal received from the wireless circuit 73.

Meanwhile, the diplexer 122 outputs a radio signal received from the 2.4G wireless LAN on-vehicle device 12, to the wireless circuit 73. The diplexer 122 outputs a radio signal received from the 5G wireless LAN on-vehicle device 11, to the wireless circuit 73. The diplexer 122 combines the radio signal received from the 2.4G wireless LAN on-vehicle device 12 and the radio signal received from the 5G wireless LAN on-vehicle device 11, and outputs the resultant radio signal to the wireless circuit 73.

[Power Supply Circuit on On-Vehicle-Device Side]

The on-vehicle-device-side circuit unit 51 further includes an on-vehicle-device-side power supply circuit 91. The on-vehicle-device-side power supply circuit 91 includes a bias T 91A, for example.

The on-vehicle-device-side power supply circuit 91 superimposes power on the transmission line 81, in a portion, in the transmission line 81 provided on the on-vehicle-device side, that is on the side opposite to the path part 41 with respect to the wireless circuit 75 which is the wireless circuit 70 nearest to the path part 41. For example, the on-vehicle-device-side power supply circuit 91 is connected to transmission line 81, and superimposes power on the transmission line 81 via the bias T 91A.

For example, the on-vehicle-device-side power supply circuit 91 superimposes power on the transmission line 81, in a portion, in the transmission line 81 provided on the on-vehicle-device side, that is on the side opposite to the path part 41 with respect to the wireless circuit 72 which is the wireless circuit 70 farthest from the path part 41.

Specifically, as shown in FIG. 8, the output port of the bias T 91A is connected to a portion between the wireless circuit 72 and the 5G wireless LAN on-vehicle device 11 in the transmission line 81, and a DC voltage generated in the on-vehicle-device-side power supply circuit 91 is outputted to the transmission line 81 at this portion.

Figure 9:
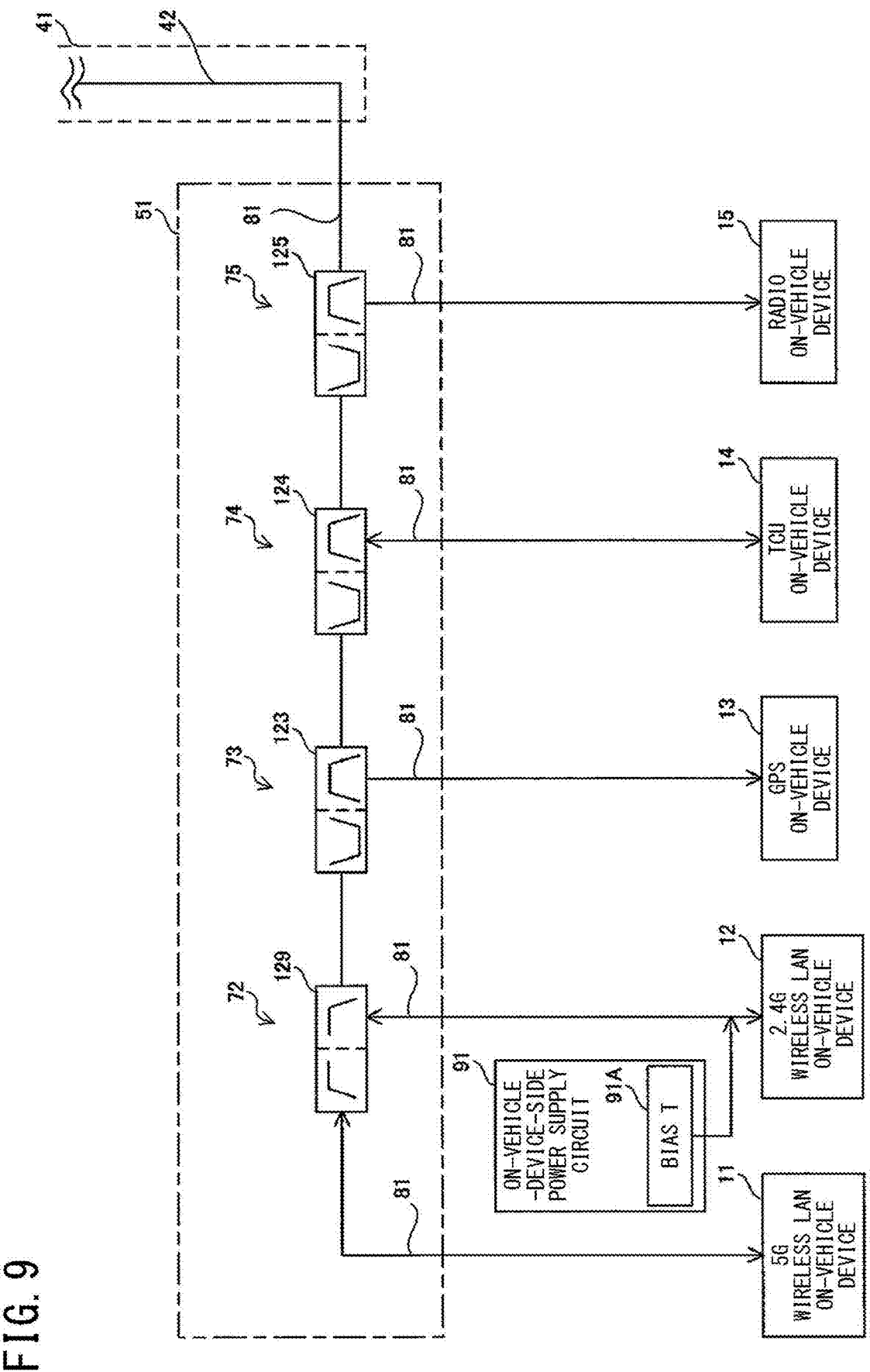
FIG. 9 shows another example of a configuration of the on-vehicle-device side in the on-vehicle transmission system according to the second embodiment of the present disclosure.

FIG. 9 shows another example of a configuration of the on-vehicle-device side in the on-vehicle transmission system according to the second embodiment of the present disclosure.

With reference to FIG. 9, a modification diplexer 129 in the wireless circuit 72 is implemented by a low-pass filter and a high-pass filter, for example.

More specifically, the modification diplexer 129 in the wireless circuit 72 receives a radio signal obtained by combining a plurality of frequency components, from the wireless circuit 73, and separates a frequency component in a signal band of not higher than 2.4 GHz. The modification diplexer 129 outputs the separated radio signal to the 2.4G wireless LAN on-vehicle device 12. The modification diplexer 129 outputs, to the 5G wireless LAN on-vehicle device 11, a radio signal including frequency components other than the frequency component of not higher than 2.4 GHz, in the radio signal received from the wireless circuit 73.

Also in the example shown in FIG. 9, as in the example shown in FIG. 8, the on-vehicle-device-side power supply circuit 91 superimposes power on the transmission line 81, in a portion, in the transmission line 81 provided on the on-vehicle-device side, that is on the side opposite to the path part 41 with respect to the wireless circuit 75 which is the wireless circuit 70 nearest to the path part 41.

For example, the on-vehicle-device-side power supply circuit 91 superimposes power on the transmission line 81, in a portion, in the transmission line 81 provided on the on-vehicle-device side, that is on the side opposite to the path part 41 with respect to the wireless circuit 72 which is the wireless circuit 70 farthest from the path part 41.

Specifically, the output port of the bias T 91A is connected to a portion between the wireless circuit 72 and the 2.4G wireless LAN on-vehicle device 12 in the transmission line 81, and a DC voltage generated in the on-vehicle-device-side power supply circuit 91 is outputted to the transmission line 81 at this portion.

[Antenna-Side Circuit Unit]

Figure 10:
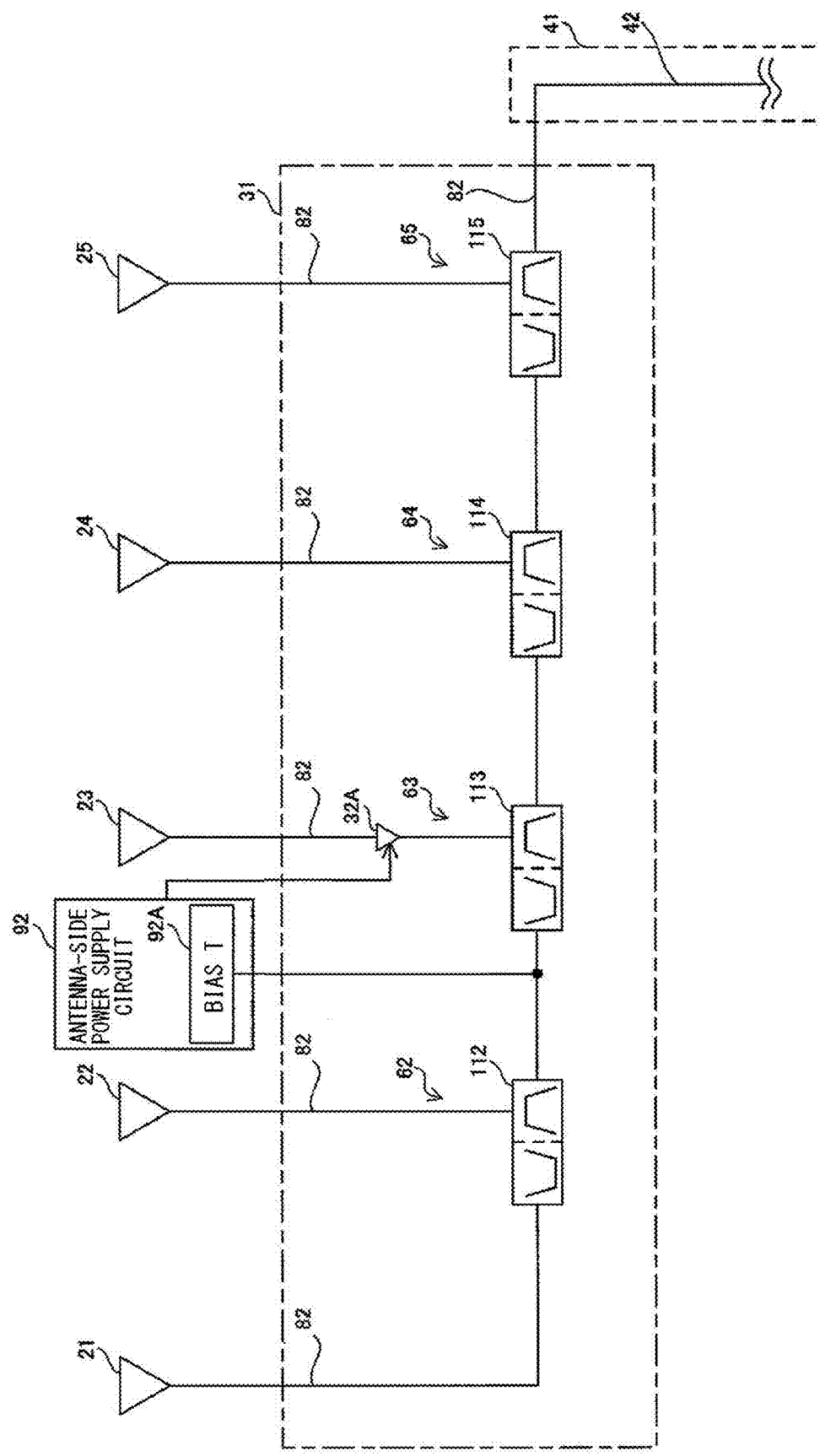
FIG. 10 shows an example of a configuration of the antenna side in the on-vehicle transmission system according to the second embodiment of the present disclosure.

FIG. 10 shows an example of a configuration of the antenna side in the on-vehicle transmission system according to the second embodiment of the present disclosure.

With reference to FIG. 10, the on-vehicle transmission system 101 includes a transmission line 82 which connects circuit elements on the antenna side.

The antenna-side circuit unit 31 includes wireless circuits 62 to 65 which receive radio signals in frequency bands different from each other. The wireless circuits 62 to 65 are connected in series, that is, subordinately connected. In the antenna-side circuit unit 31, each wireless circuit 60 for which the frequency band of the radio signal to be received is lower is connected at a side closer to the path part 41.

More specifically, the wireless circuit 65, the wireless circuit 64, the wireless circuit 63, and the wireless circuit 62 are connected to each other in this order from the path part 41 side via the transmission line 82. Hereinafter, in the description of the present embodiment, each of the wireless circuits 62 to 65 is also referred to as a wireless circuit 60.

Each wireless circuit 60 is connected, via the transmission line 82, to an antenna capable of receiving a radio signal in a corresponding frequency band.

For example, the wireless circuit 65 is connected to the antenna 25, the wireless circuit 64 is connected to the antenna 24, the wireless circuit 63 is connected to the antenna 23, and the wireless circuit 62 is connected to the antenna 22 and the antenna 21.

The wireless circuits 62 to 65 respectively include diplexers 112 to 115 which each combine radio signals in the transmission line 82. The diplexers 112 to 115 also function as filters that each separate the radio signal in the transmission line 82. For example, the diplexers 112 to 115 are connected in series via the transmission line 82. As an example, the diplexers 112 to 115 are implemented by band-pass filters and band-rejection filters.

For example, a DC frequency component is included in the passband of each of the diplexers 112 to 115 which are filters of the respective wireless circuits 62 to 65.

The diplexer 115 in the wireless circuit 65 receives a radio signal received at the antenna 25 and corresponding to AM radio, and outputs the received radio signal to the path part 41. The diplexer 115 outputs a radio signal received from the wireless circuit 64, to the path part 41. The diplexer 115 combines the radio signal received at the antenna 25 and corresponding to AM radio, and the radio signal received from the wireless circuit 64, and outputs the resultant radio signal to the path part 41.

Meanwhile, the diplexer 115 outputs a radio signal received from the path part 41, to the wireless circuit 64.

The diplexer 114 in the wireless circuit 64 receives a radio signal received at the antenna 24 and corresponding to LTE in 700 MHz band, and outputs the received radio signal to the wireless circuit 65. The diplexer 114 outputs a radio signal received from the wireless circuit 63, to the wireless circuit 65. The diplexer 114 combines the radio signal received at the antenna 24 and corresponding to LTE in 700 MHz band, and the radio signal received from the wireless circuit 63, and outputs the resultant radio signal to the wireless circuit 65.

Meanwhile, the diplexer 114 separates a frequency component in a signal band including 700 MHz that is a radio signal corresponding to LTE in 700 MHz band, from the radio signal received from the wireless circuit 65. The diplexer 114 outputs the separated radio signal, to the antenna 24. The diplexer 114 outputs, to the wireless circuit 63, a radio signal including frequency components outside the signal band including 700 MHz, in the radio signal received from the wireless circuit 65.

The diplexer 113 in the wireless circuit 63 receives a radio signal received at the antenna 23 and corresponding to GPS, and outputs the received radio signal to the wireless circuit 64. The diplexer 113 outputs a radio signal received from the wireless circuit 62, to the wireless circuit 64. The diplexer 113 combines the radio signal received at the antenna 23 and corresponding to GPS, and the radio signal received from the wireless circuit 62, and outputs the resultant radio signal to the wireless circuit 64.

Meanwhile, the diplexer 113 outputs a radio signal received from the wireless circuit 64, to the wireless circuit 62.

The antenna-side circuit unit 31 includes an LNA 32A which is connected between the diplexer 113 and the antenna 23 and which amplifies the radio signal received at the antenna 23.

The diplexer 112 in the wireless circuit 62 receives a radio signal received at the antenna 22 and corresponding to wireless LAN in 2.4 GHz band, and outputs the received radio signal to the wireless circuit 63. The diplexer 112 outputs, to the wireless circuit 63, a radio signal received at the antenna 21 and corresponding to wireless LAN in 5 GHz band. The diplexer 112 combines the radio signal received at the antenna 22 and corresponding to wireless LAN in 2.4 GHz band, and the radio signal received at the antenna 21 and corresponding to wireless LAN in 5 GHz band, and outputs the resultant radio signal to the wireless circuit 63.

Meanwhile, the diplexer 112 separates a frequency component in a signal band including 2.4 GHz that is a radio signal corresponding to wireless LAN in 2.4 GHz band, from the radio signal received from the wireless circuit 63. The diplexer 112 outputs the separated radio signal to the antenna 22. The diplexer 112 outputs, to the antenna 21, a radio signal that includes frequency components outside the signal band including 2.4 GHz and that includes a frequency component in a signal band including 5.2 GHz to 5.6 GHz, in the radio signal received from the wireless circuit 63.

[Power Supply Circuit on Antenna Side]

The antenna-side circuit unit 31 further includes an antenna-side power supply circuit 92. The antenna-side power supply circuit 92 includes a bias T 92A, for example.

The antenna-side power supply circuit 92 obtains power from the transmission line 82, in a portion, in the transmission line 82 provided on the antenna side, that is on the side opposite to the path part 41 with respect to the wireless circuit 65 which is the wireless circuit 60 nearest to the path part 41. For example, the antenna-side power supply circuit 92 is connected to the transmission line 82 and obtains power from the transmission line 82 via the bias T 91A. The antenna-side power supply circuit 92 supplies the obtained power to each circuit on the antenna side.

Specifically, as shown in FIG. 10, the input port of the bias T 92A is connected to a portion between the wireless circuit 62 and the wireless circuit 63 in the transmission line 82. The antenna-side power supply circuit 92 receives a DC voltage from the transmission line 82 at this portion.

The antenna-side power supply circuit 92 may obtain power from the transmission line 82, in a portion, in the transmission line 82 provided on the antenna side, that is on the side opposite to the path part 41 with respect to the wireless circuit 62 which is the wireless circuit 60 farthest from the path part 41.

Figure 11:
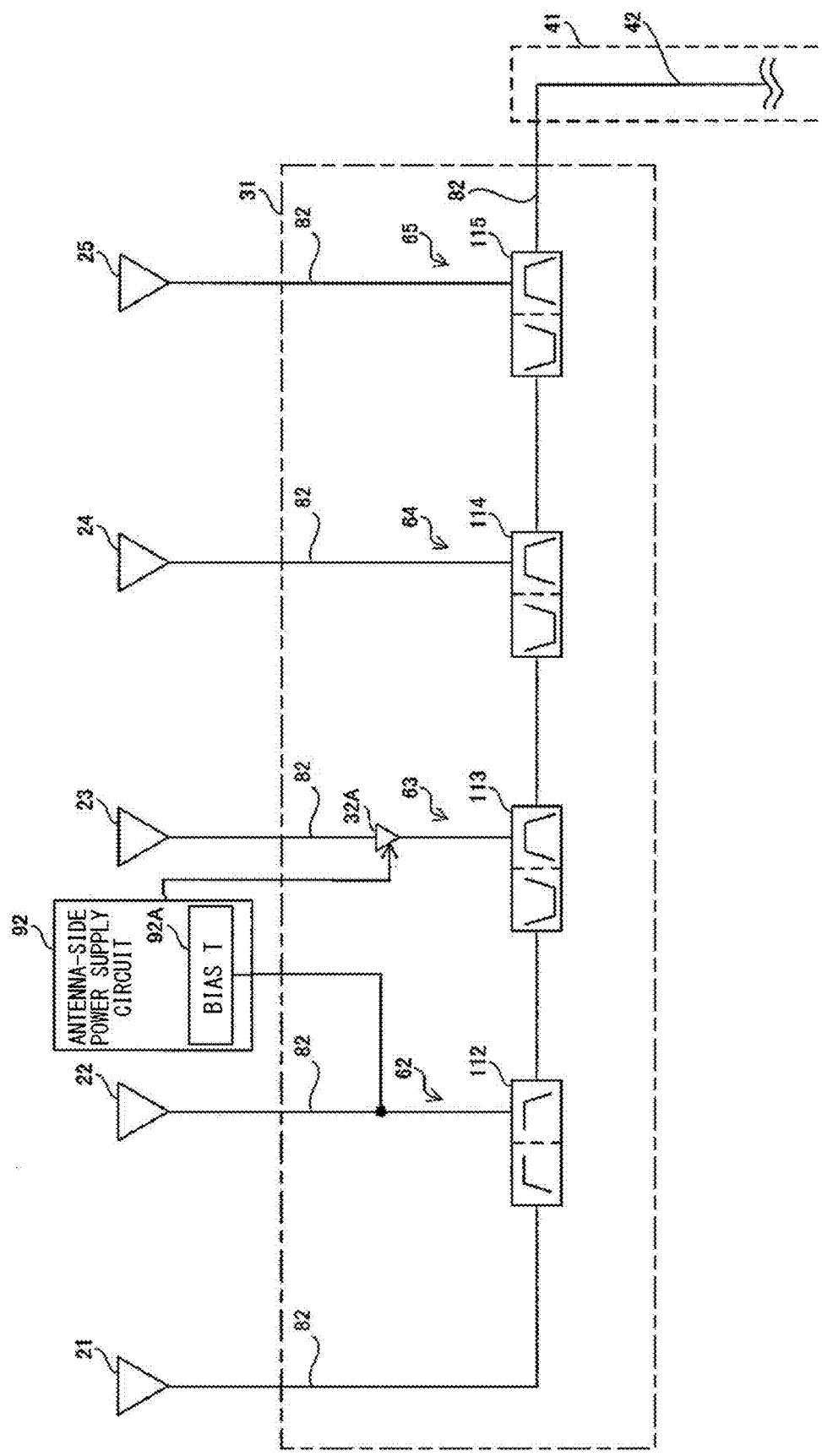
FIG. 11 shows another example of a configuration of the antenna side in the on-vehicle transmission system according to the second embodiment of the present disclosure.

FIG. 11 shows another example of a configuration of the antenna side in the on-vehicle transmission system according to the second embodiment of the present disclosure.

With reference to FIG. 11, the diplexer 112 in the wireless circuit 62 is implemented by a low-pass filter and a high-pass filter, for example.

More specifically, the diplexer 112 in the wireless circuit 62 receives a radio signal received at the antenna 22 and corresponding to wireless LAN in 2.4 GHz band, and outputs the received radio signal to the wireless circuit 63. The diplexer 112 outputs a radio signal received at the antenna 21 and corresponding to wireless LAN in 5 GHz band, to the wireless circuit 63. The diplexer 112 combines the radio signal received at the antenna 22 and corresponding to wireless LAN in 2.4 GHz band, and the radio signal received at the antenna 21 and corresponding to wireless LAN in 5 GHz band, and outputs the resultant radio signal to the wireless circuit 63.

Meanwhile, the diplexer 112 separates a frequency component in a signal band of not higher than 2.4 GHz, from the radio signal received from the wireless circuit 63. The diplexer 112 outputs the separated radio signal to the antenna 22. The diplexer 112 outputs, to the antenna 21, a radio signal including frequency components other than the frequency component of not higher than 2.4 GHz, in the radio signal received from the wireless circuit 63.

Also in the example shown in FIG. 11, as in the example shown in FIG. 10, the antenna-side power supply circuit 92 obtains power from the transmission line 82, in a portion, in the transmission line 82 provided on the antenna side, that is on the side opposite to the path part 41 with respect to the wireless circuit 65 which is the wireless circuit 60 nearest to the path part 41.

For example, the antenna-side power supply circuit 92 obtains power from the transmission line 82, in a portion, in the transmission line 82 provided on the antenna side, that is on the side opposite to the path part 41 with respect to the wireless circuit 62 which is the wireless circuit 60 farthest from the path part 41.

Specifically, the input port of the bias T 92A is connected to a portion between the wireless circuit 62 and the antenna 22 in the transmission line 82. The antenna-side power supply circuit 92 receives a DC voltage from the transmission line 82 at this portion.

[Modification]

Figure 12:
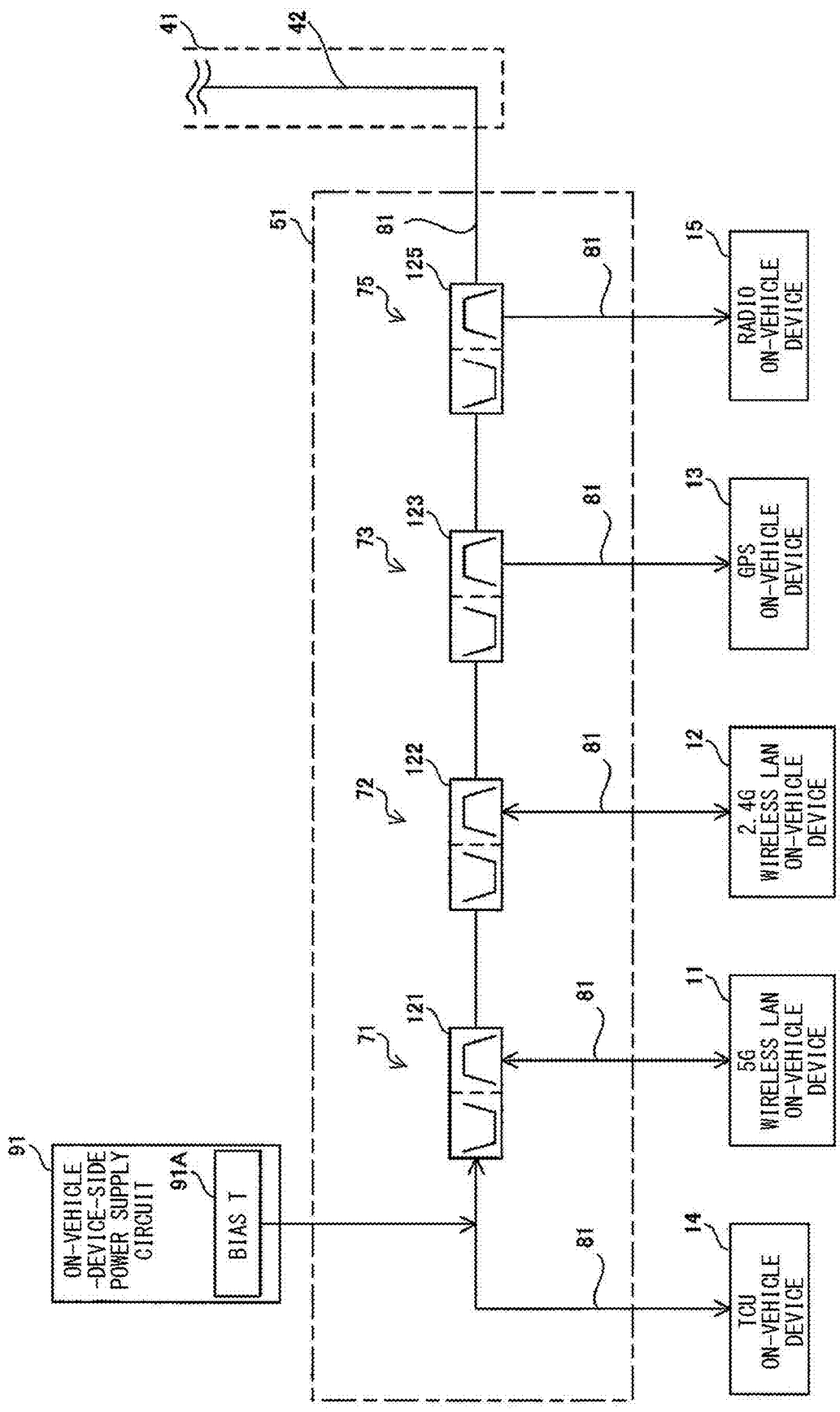
FIG. 12 shows an example of a configuration of the on-vehicle-device side in a modification of the on-vehicle transmission system according to the second embodiment of the present disclosure.

FIG. 12 shows an example of a configuration of the on-vehicle-device side in a modification of the on-vehicle transmission system according to the second embodiment of the present disclosure.

With reference to FIG. 12, the wireless circuit 75, the wireless circuit 73, the wireless circuit 72, and the wireless circuit 71 are connected to each other in this order from the path part 41 side via the transmission line 81.

In the on-vehicle-device-side circuit unit 51, the TCU on-vehicle device 14 connected to the wireless circuit 71 is capable of transmitting/receiving radio signals in a plurality of frequency bands, and the wireless circuit 71 is connected to the farthest end, i.e., at the last, with respect to the path part 41, and is positioned at the last stage, i.e., in the last part, among the wireless circuits 70.

In the on-vehicle-device-side circuit unit 51, the wireless circuit 71 is connected to the TCU on-vehicle device 14 capable of transmitting/receiving radio signals in a plurality of frequency bands, and is connected to the farthest end with respect to the path part 41. As for the wireless circuits 70 other than the wireless circuit 71, each wireless circuit 70 for which the frequency band of the radio signal to be received is lower is connected to a side closer to the path part 41.

Figure 13:
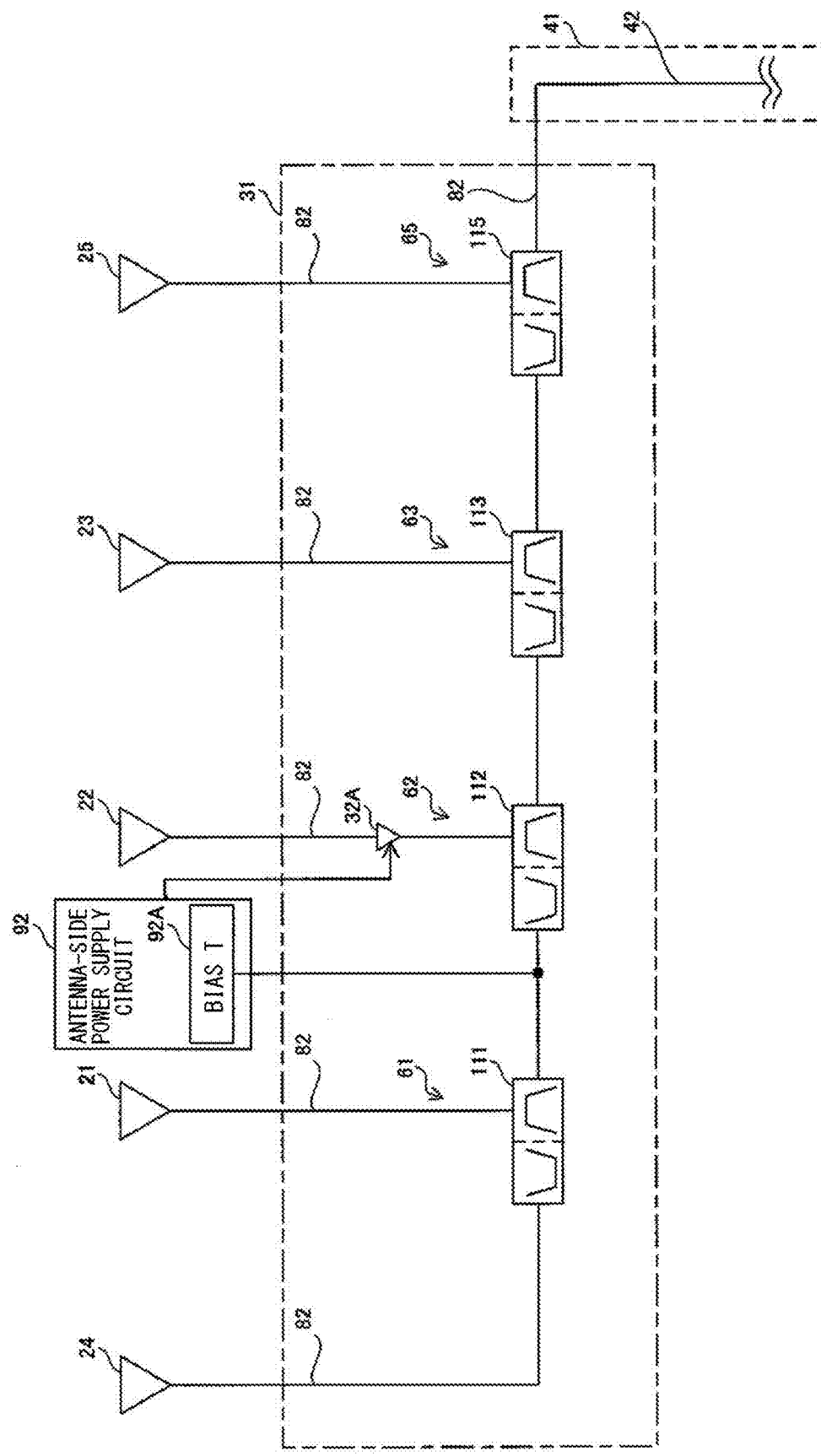
FIG. 13 shows an example of a configuration of the antenna side in a modification of the on-vehicle transmission system according to the second embodiment of the present disclosure.

FIG. 13 shows an example of a configuration of the antenna side in a modification of the on-vehicle transmission system according to the second embodiment of the present disclosure.

With reference to FIG. 13, the wireless circuit 65, the wireless circuit 63, the wireless circuit 62, and the wireless circuit 61 are connected to each other in this order from the path part 41 side via the transmission line 82.

In the antenna-side circuit unit 31, the antenna 24 connected to the wireless circuit 61 is capable of transmitting/receiving radio signals in a plurality of frequency bands, and the wireless circuit 61 is connected to the farthest end, i.e., at the last, with respect to the path part 41, and is positioned at the last stage, i.e., in the last part, among the wireless circuits 60.

In the antenna-side circuit unit 31, the wireless circuit 61 is connected to an antenna capable of transmitting/receiving radio signals in a plurality of frequency bands, and is connected to the farthest end with respect to the path part 41. As for the wireless circuits 60 other than the wireless circuit 61, each wireless circuit 60 for which the frequency band of the radio signal to be received is lower is connected to a side closer to the path part 41.

In the on-vehicle transmission system 101 according to the second embodiment of the present disclosure, the bias T 91A is provided outside the on-vehicle-device-side circuit unit 51, and is provided outside the on-vehicle devices. However, the present disclosure is not limited thereto. In the on-vehicle transmission system 101, the bias T 91A may be included in the on-vehicle-device-side circuit unit 51, may be included in a wireless circuit 70, or may be included in an on-vehicle device.

In the on-vehicle transmission system 101 according to the second embodiment of the present disclosure, the bias T 92A is provided outside the antenna-side circuit unit 31. However, the present disclosure is not limited thereto. In the on-vehicle transmission system 101, the bias T 92A may be included in the antenna-side circuit unit 31, or may be included in a wireless circuit 60.

As described above, with respect to the on-vehicle transmission system 101 according to the second embodiment of the present disclosure, in the on-vehicle-device-side circuit unit 51, each wireless circuit 70 for which the frequency band of the radio signal to be received is lower is connected to a side closer to the path part 41.

Due to this configuration, a radio signal in a higher frequency band can be set as the radio signal to be filtered in the on-vehicle-device-side power supply circuit 91. Therefore, the configuration of the on-vehicle-device-side power supply circuit 91 can be simplified.

With respect to the on-vehicle transmission system 101 according to the second embodiment of the present disclosure, in the antenna-side circuit unit 31, each wireless circuit 60 for which the frequency band of the radio signal to be received is lower is connected to a side closer to the path part 41.

Due to this configuration, a radio signal in a higher frequency band can be set as the radio signal to be filtered in the antenna-side power supply circuit 92. Therefore, the configuration of the antenna-side power supply circuit 92 can be simplified.

The other configurations and operations are the same as those in the on-vehicle transmission system 101 according to the first embodiment, and thus, specific description thereof is not repeated here.

Next, another embodiment of the present disclosure is described with reference to the drawings. In the drawings, the same or corresponding parts are denoted by the same reference signs, and the description thereof is not repeated.

Third Embodiment

The present embodiment relates to an on-vehicle transmission system 101 in which the on-vehicle-device-side circuit unit and the antenna-side circuit unit each include a plurality of transmission lines, when compared with the on-vehicle transmission system 101 according to the first embodiment. Other than the content described below, the on-vehicle transmission system 101 according to the present embodiment is the same as the on-vehicle transmission system 101 in the first and second embodiments.

[On-Vehicle-Device-Side Circuit Unit]

Figure 14:
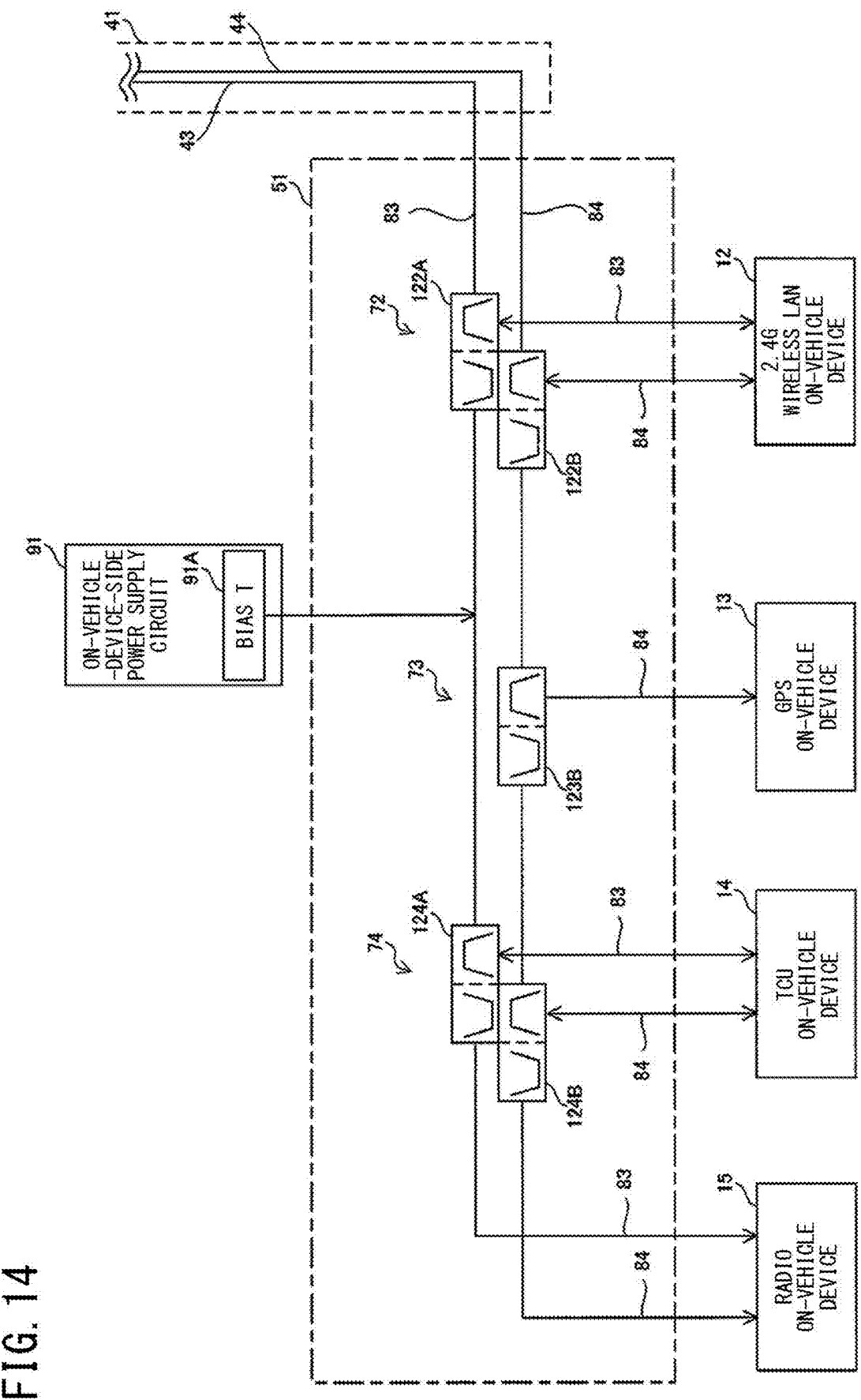
FIG. 14 shows an example of a configuration of the on-vehicle-device side in an on-vehicle transmission system according to a third embodiment of the present disclosure.

FIG. 14 shows an example of a configuration of the on-vehicle-device side in the on-vehicle transmission system according to a third embodiment of the present disclosure.

With reference to FIG. 14, the on-vehicle transmission system 101 includes an on-vehicle-device-side circuit unit 51, a 2.4G wireless LAN on-vehicle device 12, a GPS on-vehicle device 13, a TCU on-vehicle device 14, and a radio on-vehicle device 15, on the on-vehicle-device side.

The on-vehicle-device-side circuit unit 51 includes wireless circuits 72 to 74 which receive radio signals in frequency bands different from each other. The wireless circuits 72 to 74 are connected in series, that is, subordinately connected. Hereinafter, in the description of the present embodiment, each of the wireless circuits 72 to 74 is also referred to as a wireless circuit 70.

In the example shown in FIG. 14, the path part 41 includes transmission lines 43 and 44 which are not electrically connected to each other. The transmission lines 43 and 44 are antenna cables, for example. The on-vehicle-device-side circuit unit 51 includes transmission lines 83 and 84 which connect circuit elements on the on-vehicle-device side. For example, the transmission line 83 and the transmission line 84 are not electrically connected to each other.

More specifically, an end portion of the transmission line 83 is connected to the transmission line 43 in the path part 41, and an end portion of transmission line 84 is connected to the transmission line 44 in the path part 41. Accordingly, the on-vehicle-device-side circuit unit 51 receives a radio signal from the path part 41, and outputs a radio signal to the path part 41. The transmission line 83 and the transmission line 43 may be an integrated transmission line, and the transmission line 84 and the transmission line 44 may be an integrated transmission line.

The plurality of wireless circuits 70 in the on-vehicle-device-side circuit unit 51 include a single-line circuit which is a wireless circuit that receives a radio signal from one transmission line 83, and a multi-line circuit which is a wireless circuit that receives radio signals from a plurality of transmission lines 83 and 84. The number of the single-line circuit and the multi-line circuit may each be one or a plurality.

In the example shown in FIG. 14, the wireless circuit 73 is a single-line circuit, and the wireless circuits 72 and 74 are each a multi-line circuit.

More specifically, the wireless circuit 72, the wireless circuit 73, and the wireless circuit 74 are connected to each other in this order from the path part 41 side via the transmission line 84. The wireless circuit 72 and the wireless circuit 74 are connected to each other in this order from the path part 41 side via the transmission line 83.

Each wireless circuit 70 is connected, via the transmission line 83 or the transmission line 84, to an on-vehicle device capable of providing a service that uses a radio signal in a corresponding frequency band.

For example, the wireless circuit 72 is connected to the 2.4G wireless LAN on-vehicle device 12 via the transmission line 83 and the transmission line 84, the wireless circuit 73 is connected to the GPS on-vehicle device 13 via the transmission line 84, and the wireless circuit 74 is connected to the TCU on-vehicle device 14 via the transmission line 83 and the transmission line 84 and is connected to the radio on-vehicle device 15 via the transmission line 83 and the transmission line 84.

For example, the wireless circuits 72, 74 are each a wireless transmission/reception circuit, and the wireless circuit 73 is a wireless reception circuit.

The on-vehicle-device-side circuit unit 51 splits a radio signal received from the path part 41 and provides the resultant radio signals to the respective wireless circuits 70.

More specifically, each wireless circuit 70 includes at least one of a diplexer which functions as a filter that separates the radio signal in the transmission line 83, and a diplexer which functions as a filter that separates the radio signal in the transmission line 84.

For example, the wireless circuit 72 includes a diplexer 122A and a diplexer 122B, the wireless circuit 73 includes a diplexer 123B, and the wireless circuit 74 includes a diplexer 124A and a diplexer 124B.

For example, the diplexers 122A and 124A are connected in series via the transmission line 83, and the diplexers 122B, 123B, and 124B are connected in series via the transmission line 84. As an example, the diplexers 122A, 122B, 123B, 124A, and 124B are implemented by band-pass filters and band-rejection filters.

A DC frequency component is included in the passband of each of the diplexers 122A and 122B of the wireless circuit 72, the diplexer 123B of the wireless circuit 73, and the diplexers 124A and 124B of the wireless circuit 74.

The diplexer 122A in the wireless circuit 72 receives a radio signal obtained by combining a plurality of frequency components, from the transmission line 43 in the path part 41, and separates a frequency component in a signal band including 2.4 GHz that is a radio signal corresponding to wireless LAN in 2.4 GHz band. The diplexer 122A outputs the separated radio signal to the 2.4G wireless LAN on-vehicle device 12. The diplexer 122A outputs, to the wireless circuit 74, a radio signal including frequency components other than the frequency component in the signal band including 2.4 GHz, in the radio signal received from the transmission line 43 in the path part 41.

Meanwhile, the diplexer 122A outputs a radio signal received from the 2.4G wireless LAN on-vehicle device 12, to the transmission line 43 in the path part 41. The diplexer 122A outputs a radio signal received from the wireless circuit 74, to the transmission line 43 in the path part 41. The diplexer 122A combines the radio signal received from the 2.4G wireless LAN on-vehicle device 12 and the radio signal received from the wireless circuit 74, and outputs the resultant radio signal to the transmission line 43 in the path part 41.

The diplexer 122B in the wireless circuit 72 receives a radio signal obtained by combining a plurality of frequency components, from the transmission line 44 in the path part 41, and separates a frequency component in the signal band including 2.4 GHz that is a radio signal corresponding to wireless LAN in 2.4 GHz band. The diplexer 122B outputs the separated radio signal to the 2.4G wireless LAN on-vehicle device 12. The diplexer 122B outputs, to the wireless circuit 73, a radio signal including frequency components other than the frequency component in the signal band including 2.4 GHz, in the radio signal received from the transmission line 44 in the path part 41.

Meanwhile, the diplexer 122B outputs a radio signal received from the 2.4G wireless LAN on-vehicle device 12, to the transmission line 44 in the path part 41. The diplexer 122B outputs a radio signal received from the wireless circuit 73, to the transmission line 44 in the path part 41. The diplexer 122B combines the radio signal received from the 2.4G wireless LAN on-vehicle device 12 and the radio signal received from the wireless circuit 73, and outputs the resultant radio signal to the transmission line 44 in the path part 41.

The diplexer 123B in the wireless circuit 73 receives a radio signal obtained by combining a plurality of frequency components, from the wireless circuit 72, and separates a frequency component in a signal band including 1.2 GHz to 1.6 GHz that is a radio signal corresponding to GPS. The diplexer 123B outputs the separated radio signal to the GPS on-vehicle device 13. The diplexer 123B outputs, to the wireless circuit 74, a radio signal including frequency components other than the frequency component in the signal band including 1.2 GHz to 1.6 GHz, in the radio signal received from the wireless circuit 72.

Meanwhile, the diplexer 123B outputs a radio signal received from the wireless circuit 74, to the wireless circuit 72.

The diplexer 124A in the wireless circuit 74 receives a radio signal obtained by combining a plurality of frequency components, from the wireless circuit 72, and separates a frequency component in a signal band including 700 MHz that is a radio signal corresponding to TCU. The diplexer 124A outputs the separated radio signal to the TCU on-vehicle device 14. The diplexer 124A outputs, to the radio on-vehicle device 15, a radio signal that includes frequency components other than the frequency component in the signal band including 700 MHz and that includes a frequency component in a signal band including 1 MHz that is a radio signal corresponding to AM radio, in the radio signal received from the wireless circuit 72.

Meanwhile, the diplexer 124A outputs a radio signal received from the TCU on-vehicle device 14, to the wireless circuit 72.

The diplexer 124B in the wireless circuit 74 receives a radio signal obtained by combining a plurality of frequency components, from the wireless circuit 73, and separates a frequency component in the signal band including 700 MHz that is a radio signal corresponding to TCU. The diplexer 124B outputs the separated radio signal to the TCU on-vehicle device 14. The diplexer 124B outputs, to the radio on-vehicle device 15, a radio signal that includes frequency components other than the frequency component in the signal band including 700 MHz and that includes a frequency component in the signal band including 1 MHz that is a radio signal corresponding to AM radio, in the radio signal received from the wireless circuit 73.

Meanwhile, the diplexer 124B outputs a radio signal received from the TCU on-vehicle device 14, to the wireless circuit 73.

[Power Supply Circuit on On-Vehicle-Device Side]

The on-vehicle-device-side circuit unit 51 further includes an on-vehicle-device-side power supply circuit 91. The on-vehicle-device-side power supply circuit 91 includes a bias T 91A, for example.

The on-vehicle-device-side power supply circuit 91 supplies power to each circuit on the on-vehicle-device side, and supplies power from the on-vehicle-device side to the antenna side via the path part 41. The on-vehicle-device-side power supply circuit 91 superimposes power on a transmission line different from a transmission line having a largest number of single-line circuits connected thereto among the transmission lines 83 and 84. For example, the on-vehicle-device-side power supply circuit 91 is connected to and superimposes power via the bias T 91A to a transmission line different from a transmission line having a largest number of single-line circuits connected thereto among the transmission lines 83 and 84.

In the example shown in FIG. 14, the wireless circuit 73, which is a single-line circuit, is connected to the transmission line 84, and no single-line circuit is connected to the transmission line 83. The on-vehicle-device-side power supply circuit 91 superimposes power to the transmission line 83, which is different from the transmission line 84 which is the transmission line having a largest number of single-line circuits connected thereto among the transmission lines 83 and 84.

For example, the on-vehicle-device-side power supply circuit 91 superimposes power on the transmission line 83, in a portion, in the transmission line 83, that is on the side opposite to the path part 41 with respect to the wireless circuit 72 which is the wireless circuit 70 nearest to the path part 41.

In the example shown in FIG. 14, the output port of the bias T 91A is connected to a portion between the wireless circuit 72 and the wireless circuit 74 in the transmission line 83, and a DC voltage generated in the on-vehicle-device-side power supply circuit 91 is outputted to the transmission line 83 at this portion.

[Antenna-Side Circuit Unit]

Figure 15:
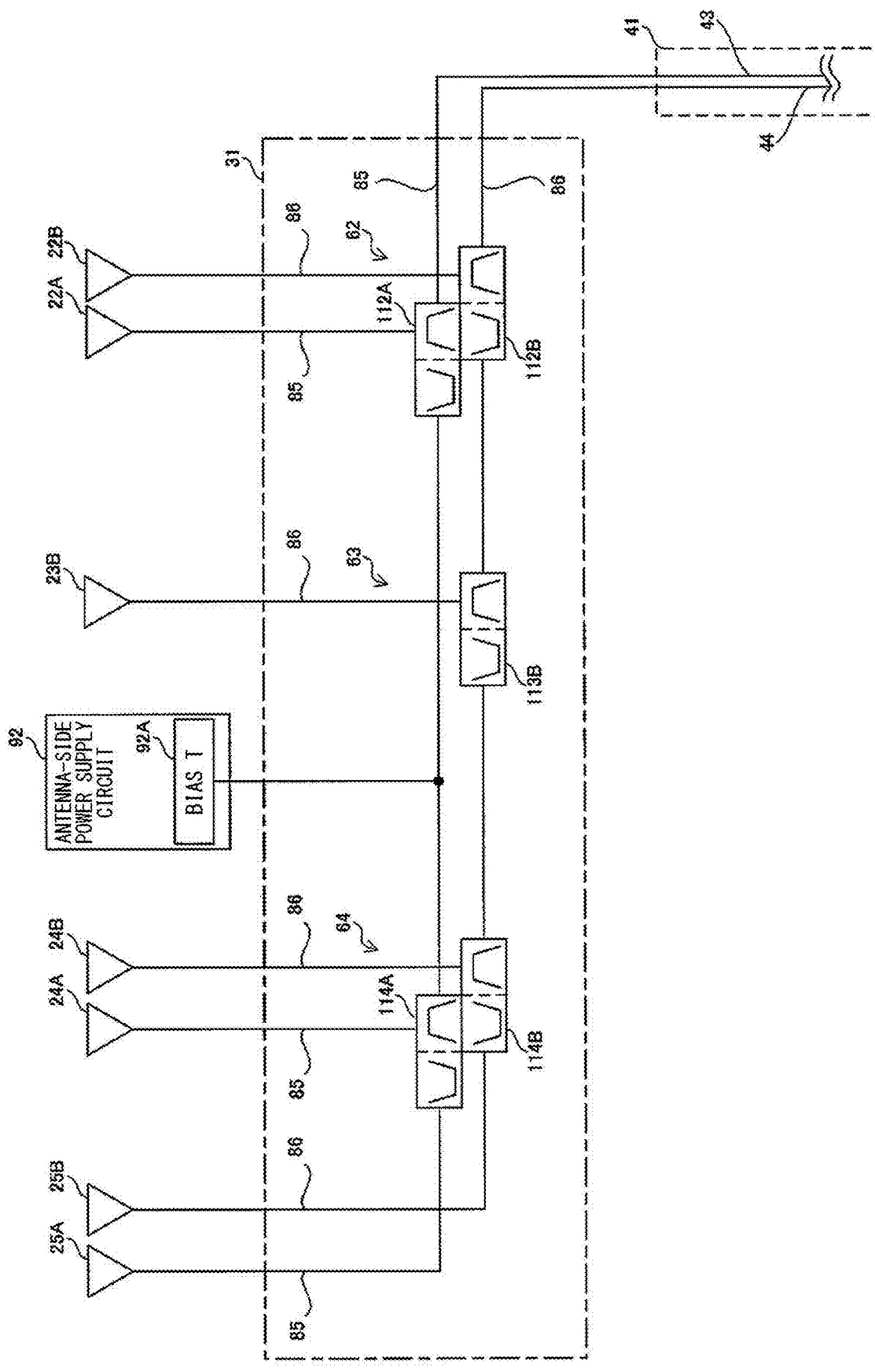
FIG. 15 shows an example of a configuration of the antenna side in the on-vehicle transmission system according to the third embodiment of the present disclosure.

FIG. 15 shows an example of a configuration of the antenna side in the on-vehicle transmission system according to the third embodiment of the present disclosure.

With reference to FIG. 15, the antenna-side circuit unit 31 includes wireless circuits 62 to 64 which receive radio signals in frequency bands different from each other. The wireless circuits 62 to 64 are connected in series, that is, subordinately connected. Hereinafter, in the description of the present embodiment, each of the wireless circuits 62 to 64 is also referred to as a wireless circuit 60.

In the example shown in FIG. 15, the antenna-side circuit unit 31 includes transmission lines 85 and 86 which connect circuit elements on the antenna side. For example, the transmission line 85 and the transmission line 86 are not electrically connected to each other.

More specifically, an end portion of the transmission line 85 is connected to the transmission line 43 in the path part 41, and an end portion of the transmission line 86 is connected to the transmission line 44 in the path part 41. Accordingly, the antenna-side circuit unit 31 receives a radio signal from the path part 41 and outputs a radio signal to the path part 41. The transmission line 85 and the transmission line 43 may be an integrated transmission line, and the transmission line 86 and the transmission line 44 may be an integrated transmission line.

The plurality of wireless circuits 60 in the antenna-side circuit unit 31 include a single-line circuit which is a wireless circuit that receives a radio signal via one antenna and outputs the received radio signal to one transmission line 86, and a multi-line circuit which is a wireless circuit that receives radio signals via a plurality of antennas, and outputs the received radio signals to a plurality of transmission lines 85 and 86. The number of the single-line circuit and the multi-line circuit may each be one or a plurality.

In the example shown in FIG. 15, the wireless circuit 63 is a single-line circuit and the wireless circuits 62 and 64 are each a multi-line circuit.

More specifically, the wireless circuit 62, the wireless circuit 63, and the wireless circuit 64 are connected to each other in this order from the path part 41 side via the transmission line 86. The wireless circuit 62 and the wireless circuit 64 are connected to each other in this order from the path part 41 side via the transmission line 85.

Each wireless circuit 60 is connected, via the transmission line 85 or the transmission line 86, to an antenna capable of receiving a radio signal in a corresponding frequency band.

For example, the wireless circuit 62 is connected to an antenna 22A via the transmission line 85, and is connected to an antenna 22B via the transmission line 86. The wireless circuit 63 is connected to an antenna 23B via the transmission line 86. The wireless circuit 64 is connected to an antenna 24A via the transmission line 85, and is connected to an antenna 24B via the transmission line 86. Further, the wireless circuit 64 is connected to an antenna 25A via the transmission line 85, and is connected to an antenna 25B via the transmission line 86.

For example, the wireless circuits 62 and 64 are each a wireless transmission/reception circuit, and the wireless circuit 63 is a wireless reception circuit.

The antenna-side circuit unit 31 combines radio signals received by the respective wireless circuits 60 and outputs a resultant radio signal to the path part 41.

More specifically, each wireless circuit 60 includes at least one of a diplexer which combines radio signals in the transmission line 85, and a diplexer which combines radio signals in the transmission line 86.

For example, the wireless circuit 62 includes a diplexer 112A and a diplexer 112B, the wireless circuit 63 includes a diplexer 113B, and the wireless circuit 64 includes a diplexer 114A and a diplexer 114B. For example, the diplexers 112A and 114A are connected in series via the transmission line 85, and the diplexers 112B, 113B, and 114B are connected in series via the transmission line 86. The diplexers 112A and 114A also function as filters which each separate the radio signal in the transmission line 85, and the diplexers 112B, 113B, and 114B also function as filters which each separate the radio signal in the transmission line 86. As an example, the diplexers 112A, 112B, 113B, 114A, and 114B are implemented by band-pass filters and band-rejection filters.

A DC frequency component is included in the passband of each of the diplexers 112A and 112B of the wireless circuit 62, the diplexer 113B of the wireless circuit 63, and the diplexers 114A and 114B of the wireless circuit 64.

The diplexer 112A in the wireless circuit 62 receives a radio signal received at the antenna 22A and corresponding to wireless LAN in 2.4 GHz band, and outputs the received radio signal to the path part 41. The diplexer 112A outputs a radio signal received from the wireless circuit 64, to the path part 41. The diplexer 112A combines the radio signal received at the antenna 22A and corresponding to wireless LAN in 2.4 GHz band, and the radio signal received from the wireless circuit 64, and outputs the resultant radio signal to the path part 41.

Meanwhile, the diplexer 112A separates a frequency component in the signal band including 2.4 GHz that is a radio signal corresponding to wireless LAN in 2.4 GHz band, from a radio signal received from the path part 41. The diplexer 112A outputs the separated radio signal to the antenna 22A. The diplexer 112A outputs, to the wireless circuit 64, a radio signal including a frequency components outside the signal band including 2.4 GHz, in the radio signal received from the path part 41.

The diplexer 112B in the wireless circuit 62 receives a radio signal received at the antenna 22B and corresponding to wireless LAN in 2.4 GHz band, and outputs the received radio signal to the path part 41. The diplexer 112B outputs a radio signal received from the wireless circuit 63, to the path part 41. The diplexer 112B combines the radio signal received at the antenna 22B and corresponding to wireless LAN in 2.4 GHz band, and the radio signal received from the wireless circuit 63, and outputs the resultant radio signal to the path part 41.

Meanwhile, the diplexer 112B separates a frequency component in the signal band including 2.4 GHz that is a radio signal corresponding to wireless LAN in 2.4 GHz band, from a radio signal received from the path part 41. The diplexer 112B outputs the separated radio signal to the antenna 22B. The diplexer 112B outputs, to the wireless circuit 63, a radio signal including frequency components outside the signal band including 2.4 GHz, in the radio signal received from the path part 41.

The diplexer 113B in the wireless circuit 63 receives a radio signal received at the antenna 23B and corresponding to GPS, and outputs the received radio signal to the wireless circuit 62. The diplexer 113B outputs a radio signal received from the wireless circuit 64, to the wireless circuit 62. The diplexer 113B combines the radio signal received at the antenna 23B and corresponding to GPS, and the radio signal received from the wireless circuit 64, and outputs the resultant radio signal to the wireless circuit 62.

Meanwhile, the diplexer 113B outputs a radio signal received from the wireless circuit 62, to the wireless circuit 64.

The diplexer 114A in the wireless circuit 64 receives a radio signal received at the antenna 24A and corresponding to LTE in 700 MHz band, and outputs the received radio signal to the wireless circuit 62. The diplexer 114A receives a radio signal received at the antenna 25A and corresponding to AM radio, and outputs the received radio signal to the wireless circuit 62. The diplexer 114A combines the radio signal received at the antenna 24A and corresponding to LTE in 700 MHz band, and the radio signal received at the antenna 25A and corresponding to AM radio, and outputs the resultant radio signal to the wireless circuit 62.

Meanwhile, the diplexer 114A separates a frequency component in a signal band including 700 MHz that is a radio signal corresponding to LTE in 700 MHz band, from a radio signal received from the wireless circuit 62. The diplexer 114A outputs the separated radio signal to the antenna 24A.

The diplexer 114B in the wireless circuit 64 receives a radio signal received at the antenna 24B and corresponding to LTE in 700 MHz band, and outputs the received radio signal to the wireless circuit 63. The diplexer 114B receives a radio signal received at the antenna 25B and corresponding to AM radio, and outputs the received radio signal to the wireless circuit 63. The diplexer 114B combines the radio signal received at the antenna 24B and corresponding to LTE in 700 MHz band, and the radio signal received at the antenna 25B and corresponding to AM radio, and outputs the resultant radio signal to the wireless circuit 63.

Meanwhile, the diplexer 114B separates a frequency component in the signal band including 700 MHz that is a radio signal corresponding to LTE in 700 MHz band, from a radio signal received from the wireless circuit 63. The diplexer 114B outputs the separated radio signal to the antenna 24B.

[Power Supply Circuit on Antenna Side]

The antenna-side circuit unit 31 further includes an antenna-side power supply circuit 92. The antenna-side power supply circuit 92 includes a bias T 92A, for example.

The antenna-side power supply circuit 92 obtains power supplied from the on-vehicle-device side to the antenna side via the path part 41, and supplies the power to the above-described circuits on the antenna side. The antenna-side power supply circuit 92 obtains power from a transmission line different from a transmission line having a largest number of single-line circuits connected thereto among the transmission lines 85 and 86. For example, the antenna-side power supply circuit 92 is connected to and obtains power via the bias T 92A from a transmission line different from a transmission line having a largest number of single-line circuits connected thereto among the transmission lines 85 and 86.

In the example shown in FIG. 15, the wireless circuit 63, which is a single-line circuit, is connected to the transmission line 86, and no single-line circuit is connected to the transmission line 85. The antenna-side power supply circuit 92 obtains power from the transmission line 85, which is different from the transmission line 86 which is the transmission line having a largest number of single-line circuits connected thereto among the transmission lines 85 and 86.

For example, the antenna-side power supply circuit 92 obtains power from the transmission line 85, in a portion, in the transmission line 85, that is on the side opposite to the path part 41 with respect to the wireless circuit 62 which is the wireless circuit 60 nearest to the path part 41.

In the example shown in FIG. 15, the input port of the bias T 92A is connected to a portion between the wireless circuit 62 and the wireless circuit 64 in the transmission line 85, and the antenna-side power supply circuit 92 obtains power from the transmission line 85 at this portion.

In the on-vehicle transmission system 101 according to the third embodiment of the present disclosure, the path part 41 includes two transmission lines 43 and 44 which transmit radio signals. However, the present disclosure is not limited thereto. The path part 41 may include three or more transmission lines.

In the on-vehicle transmission system 101 according to the third embodiment of the present disclosure, the antenna-side circuit unit 31 includes two transmission lines 85 and 86. However, the present disclosure is not limited thereto. The antenna-side circuit unit 31 may include three or more transmission lines.

In the on-vehicle transmission system 101 according to the third embodiment of the present disclosure, the on-vehicle-device-side circuit unit 51 includes two transmission lines 83 and 84. However, the present disclosure is not limited thereto. The on-vehicle-device-side circuit unit 51 may include three or more transmission lines.

In the on-vehicle transmission system 101 according to the third embodiment of the present disclosure, a multi-line circuit in the antenna-side circuit unit 31 receives radio signals in the same frequency band with each other via two antennas, and outputs received radio signals to respective two transmission lines. However, the present disclosure is not limited thereto. The multi-line circuit in the antenna-side circuit unit 31 may receive radio signals in frequency bands different from each other via two antennas, and output the radio signals to respective two transmission lines.

The multi-line circuit in the antenna-side circuit unit 31 may receive radio signals in frequency bands of different numbers of types from each other via a plurality of antennas, and output the received radio signals to a plurality of respective transmission lines. In this case, preferably, the antenna-side power supply circuit 92 obtains power from a transmission line that is different from a transmission line having radio signals in a largest number of types of frequency bands outputted thereto, and that is different from a transmission line having a largest number of single-line circuits connected thereto, among a plurality of transmission lines.

Specifically, with reference to FIG. 15, for example, the wireless circuit 64 may receive, via the antenna 25A, a radio signal in a frequency band of 1 MHz corresponding to AM radio, and output the received radio signal to the transmission line 85, and in addition, receive, via the antenna 25B, a radio signal in a frequency band of 1 MHz corresponding to AM radio and a radio signal in a frequency band of 90 MHz corresponding to FM radio, and output the received radio signals to the transmission line 86.

In this case, preferably, the antenna-side power supply circuit 92 obtains power from the transmission line 85 which is different from the transmission line 86 having radio signals in a largest number of types of frequency bands outputted thereto, and which is different from the transmission line 86 having a largest number of single-line circuits connected thereto, among the transmission lines 85 and 86.

In the on-vehicle transmission system 101 according to the third embodiment of the present disclosure, the multi-line circuit in the on-vehicle-device-side circuit unit 51 receives radio signals in the same frequency band with each other via two transmission lines. However, the present disclosure is not limited thereto. The multi-line circuit in the on-vehicle-device-side circuit unit 51 may receive radio signals in frequency bands different from each other via two transmission lines.

The multi-line circuit in the on-vehicle-device-side circuit unit 51 may receive radio signals in frequency bands of different numbers of types from each other via a plurality of transmission lines. In this case, preferably, the on-vehicle-device-side power supply circuit 91 superimposes power on a transmission line that is different from a transmission line transmitting radio signals in a largest number of types of frequency bands, and that is different from a transmission line having a largest number of single-line circuit connected thereto, among a plurality of transmission lines.

Specifically, with reference to FIG. 14, for example, the wireless circuit 74 may receive, via the transmission line 83, a radio signal in a frequency band of 1 MHz corresponding to AM radio, and receive, via the transmission line 84, a radio signal in a frequency band of 1 MHz corresponding to AM radio and a radio signal in a frequency band of 90 MHz corresponding to FM radio.

In this case, preferably, the on-vehicle-device-side power supply circuit 91 superimposes power on the transmission line 83 which is different from the transmission line 84 transmitting radio signals in a largest number of types of frequency bands, and which is different from the transmission line 84 having a largest number of single-line circuit connected thereto, among the transmission lines 83 and 84.

As described above, the on-vehicle transmission system 101 according to the third embodiment of the present disclosure is mounted on a vehicle including one or a plurality of antennas and a plurality of on-vehicle devices. The path part 41 transmits a radio signal received from the antenna side, to the on-vehicle-device side. The on-vehicle-device-side circuit unit 51 includes a plurality of wireless circuits 72 to 74 which receive radio signals in frequency bands different from each other. The on-vehicle-device-side power supply circuit 91 supplies power from the on-vehicle-device side to circuits on the antenna side via the path part 41. The plurality of wireless circuits 72 to 74 are connected in series via the transmission lines 83 and 84 which transmit radio signals, and respectively connected to a plurality of on-vehicle devices via the transmission lines 83 and 84 which transmit radio signals. The on-vehicle-device-side circuit unit 51 splits a radio signal received from the path part 41 and provides the resultant radio signals to the respective wireless circuits 72 to 74. The plurality of wireless circuits 72 to 74 include: one or a plurality of single-line circuits which are each a wireless circuit 73 which receives a radio signal from one transmission line 84; and one or a plurality of multi-line circuits which are each a wireless circuit 72, 74 which receives radio signals from a plurality of transmission lines 83 and 84. The on-vehicle-device-side power supply circuit 91 superimposes power on the transmission line 83 which is different from the transmission line 84 having a largest number of single-line circuits connected thereto among the transmission lines 83 and 84.

When compared with the types of the radio signals transmitted via the transmission line 84 having a largest number of single-line circuits connected thereto, the types of the radio signals transmitted via the transmission line 83 different from the transmission line 84 is small in number. As described above, the transmission line on which the on-vehicle-device-side power supply circuit 91 superimposes power is set to the transmission line 83 different from the transmission line 84 having a largest number of single-line circuits connected thereto. Due to this configuration, the number of the types of the radio signals to be filtered in the on-vehicle-device-side power supply circuit 91 can be reduced. Therefore, the configuration of the on-vehicle-device-side power supply circuit 91 can be simplified.

Thus, in the on-vehicle transmission system 101 according to the third embodiment of the present disclosure, in a configuration in which a radio signal is transmitted between the antenna side and the on-vehicle-device side of a vehicle, power can be supplied from the on-vehicle-device side to the antenna side at low cost and in a simple configuration.

As described above, the on-vehicle transmission system 101 according to the third embodiment of the present disclosure is mounted on a vehicle including a plurality of antennas and one or a plurality of on-vehicle devices. The path part 41 transmits a radio signal received from the antenna side, to the on-vehicle-device side. The antenna-side circuit unit 31 includes a plurality of wireless circuits 62 to 64 which receive radio signals in frequency bands different from each other. The antenna-side power supply circuit 92 obtains power supplied from the on-vehicle-device side via the path part 41, and supplies the power to each circuit on the antenna side. The plurality of wireless circuits 62 to 64 are connected in series via the transmission lines 85 and 86 which transmit radio signals, and are respectively connected to a plurality of antennas via the transmission lines 85 and 86 which transmit radio signals. The antenna-side circuit unit 31 combines radio signals received by the respective wireless circuits 62 to 64, and outputs the resultant radio signal to the path part 41. The plurality of wireless circuits 62 to 64 include: one or a plurality of single-line circuits which are each a wireless circuit 63 which receives a radio signal via one antenna and outputs the received radio signal to one transmission line 86; and one or a plurality of multi-line circuits which are each a wireless circuit 62, 64 which receives radio signals via a plurality of antennas and outputs the received radio signals to a plurality of transmission lines 85 and 86. The antenna-side power supply circuit 92 obtains power from the transmission line 85 which is different from the transmission line 86 having a largest number of single-line circuits connected thereto among the transmission lines 85 and 86.

When compared with the types of the radio signals transmitted via the transmission line 86 having a largest number of single-line circuits connected thereto, the types of the radio signals transmitted via the transmission line 85 different from the transmission line 86 is small in number. As described above, the transmission line from which the antenna-side power supply circuit 92 obtains power is set to the transmission line 85 different from the transmission line 86 having a largest number of single-line circuits connected thereto. Due to this configuration, the number of the types of the radio signals to be filtered in the antenna-side power supply circuit 92 can be reduced. Therefore, the configuration of the antenna-side power supply circuit 92 can be simplified.

Therefore, in the on-vehicle transmission system 101 according to the third embodiment of the present disclosure, in a configuration in which a radio signal is transmitted between the antenna side and the on-vehicle-device side of a vehicle, power can be supplied from the on-vehicle-device side to the antenna side at low cost and in a simple configuration.

The other configurations and operations are the same as those in the on-vehicle transmission system 101 according to the first and second embodiments, and thus, specific description thereof is not repeated here.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

An on-vehicle transmission system mounted on a vehicle, the on-vehicle transmission system comprising:

a path part configured to transmit a radio signal received from an antenna side mounted on the vehicle, to an on-vehicle-device side mounted on the vehicle;

an on-vehicle-device-side circuit unit including a plurality of wireless circuits that are connected in series and that are configured to receive radio signals in frequency bands different from each other, the on-vehicle-device-side circuit unit being configured to split the radio signal received from the path part and provide resultant radio signals to the respective wireless circuits; and a power supply circuit configured to supply power from the on-vehicle-device side to the antenna side via the path part, wherein the power supply circuit includes a bias T, and the bias T superimposes power on a transmission line configured to transmit a radio signal and provided on the on-vehicle-device side, in a portion, in the transmission line, that is on a side opposite to the path part with respect to a wireless circuit that is nearest to the path part.

[Additional Note 2]

An on-vehicle transmission system mounted on a vehicle, the on-vehicle transmission system comprising:

a path part configured to transmit a radio signal received from an antenna side mounted on the vehicle, to an on-vehicle-device side mounted on the vehicle;

an antenna-side circuit unit including a plurality of wireless circuits that are connected in series and that are configured to receive radio signals in frequency bands different from each other, the antenna-side circuit unit being configured to combine the radio signals received by the respective wireless circuits and output a resultant radio signal to the path part; and a power supply circuit configured to obtain power supplied from the on-vehicle-device side to the antenna side via the path part and supply the power to each circuit on the antenna side, wherein the power supply circuit includes a bias T, and the bias T obtains power from a transmission line configured to transmit a radio signal and provided on the antenna side, in a portion, in the transmission line, that is on a side opposite to the path part with respect to a wireless circuit that is nearest to the path part.

REFERENCE SIGNS LIST 11 5G wireless LAN on-vehicle device
12 2.4G wireless LAN on-vehicle device
13 GPS on-vehicle device
14 TCU on-vehicle device
15 radio on-vehicle device
21, 22, 23, 24, 25, 22A, 22B, 23B, 24A, 24B, 25A, 25B antenna
31 antenna-side circuit unit
32A, 32B LNA
41 path part
51 on-vehicle-device-side circuit unit
61 to 65 wireless circuit
71 to 75 wireless circuit
42, 43, 81, 82, 83, 84, 85, 86 transmission line
91 on-vehicle-device-side power supply circuit
91A bias T
92 antenna-side power supply circuit
92A bias T
101 on-vehicle transmission system
111 to 115, 121 to 125, 112A, 112B, 113B, 114A, 114B, 122A, 122B, 123B, 124A, 124B diplexer
129 modification diplexer

The invention claimed is:

1. An on-vehicle transmission system mounted on a vehicle including one or a plurality of antennas and a plurality of on-vehicle devices, the on-vehicle transmission system comprising:

a path part configured to transmit a radio signal received from the antenna side, to the on-vehicle-device side;

an on-vehicle-device-side circuit unit including a plurality of wireless circuits configured to receive radio signals in frequency bands different from each other; and a power supply circuit configured to supply power from the on-vehicle-device side to a circuit on the antenna side via the path part, wherein the plurality of wireless circuits are connected in series via a transmission line configured to transmit a radio signal, and are respectively connected to the plurality of on-vehicle devices via the transmission line configured to transmit the radio signal, the on-vehicle-device-side circuit unit splits the radio signal received from the path part and provides resultant radio signals to the respective wireless circuits, and the power supply circuit superimposes power on the transmission line, in a portion, in the transmission line, that is on a side opposite to the path part with respect to the wireless circuit that is nearest to the path part.

2. The on-vehicle transmission system according to claim 1, wherein the power supply circuit superimposes power on the transmission line, in a portion, in the transmission line, that is on a side opposite to the path part with respect to the wireless circuit that is farthest from the path part.

3. The on-vehicle transmission system according to claim 1, wherein each wireless circuit includes a filter configured to filter a radio signal received from the transmission line, and a DC frequency component is included in a passband of the filter.

4. The on-vehicle transmission system according to claim 1, wherein in the on-vehicle-device-side circuit unit, each wireless circuit for which the frequency band of the radio signal to be received is lower is connected at a side closer to the path part.

5. An on-vehicle transmission system mounted on a vehicle including a plurality of antennas and one or a plurality of on-vehicle devices, the on-vehicle transmission system comprising:

a path part configured to transmit a radio signal received from the antenna side, to the on-vehicle-device side;

an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side, wherein the plurality of wireless circuits are connected in series via a transmission line configured to transmit a radio signal, and are respectively connected to the plurality of antennas via the transmission line configured to transmit the radio signal, the antenna-side circuit unit combines the radio signals received by the respective wireless circuits and outputs a resultant radio signal to the path part, and the power supply circuit obtains power from the transmission line, in a portion, in the transmission line, that is on a side opposite to the path part with respect to the wireless circuit that is nearest to the path part.

6. The on-vehicle transmission system according to claim 5, wherein the power supply circuit obtains power from the transmission line, in a portion, in the transmission line, that is on a side opposite to the path part with respect to the wireless circuit that is farthest from the path part.

7. The on-vehicle transmission system according to claim 5, wherein each wireless circuit includes a filter configured to filter a radio signal received from the transmission line, and a DC frequency component is included in a passband of the filter.

8. The on-vehicle transmission system according to claim 5, wherein in the antenna-side circuit unit, each wireless circuit for which the frequency band of the radio signal to be received is lower is connected at a side closer to the path part.

9. An on-vehicle transmission system mounted on a vehicle including one or a plurality of antennas and a plurality of on-vehicle devices, the on-vehicle transmission system comprising:

a path part configured to transmit a radio signal received from the antenna side, to the on-vehicle-device side;

an on-vehicle-device-side circuit unit including a plurality of wireless circuits configured to receive radio signals in frequency bands different from each other; and a power supply circuit configured to supply power from the on-vehicle-device side to a circuit on the antenna side via the path part, wherein the plurality of wireless circuits are connected in series via transmission lines each configured to transmit a radio signal, and are respectively connected to the plurality of on-vehicle devices via the transmission lines each configured to transmit a radio signal, the on-vehicle-device-side circuit unit splits the radio signal received from the path part and provides resultant radio signals to the respective wireless circuits, the plurality of wireless circuits include one or a plurality of single-line circuits which are each a wireless circuit configured to receive a radio signal from one of the transmission lines, and one or a plurality of multi-line circuits which are each a wireless circuit configured to receive radio signals from a plurality of the transmission lines, and the power supply circuit superimposes power on a transmission line different from a transmission line having a largest number of the single-line circuits connected thereto among the transmission lines.

10. An on-vehicle transmission system mounted on a vehicle including a plurality of antennas and one or a plurality of on-vehicle devices, the on-vehicle transmission system comprising:

a path part configured to transmit a radio signal received from the antenna side, to the on-vehicle-device side;

an antenna-side circuit unit including a plurality of wireless circuits configured to receive radio signals in frequency bands different from each other; and a power supply circuit configured to obtain power supplied from the on-vehicle-device side via the path part and supply the power to each circuit on the antenna side, wherein the plurality of wireless circuits are connected in series via transmission lines each configured to transmit a radio signal, and are respectively connected to the plurality of antennas via the transmission lines each configured to transmit a radio signal, the antenna-side circuit unit combines the radio signals received by the respective wireless circuits and outputs a resultant radio signal to the path part, the plurality of wireless circuits include one or a plurality of single-line circuits which are each a wireless circuit configured to receive a radio signal via one antenna and to output the received radio signal to one of the transmission lines, and one or a plurality of multi-line circuits which are each a wireless circuit configured to receive radio signals via a plurality of antennas and to output the received radio signals to a plurality of the transmission lines, and the power supply circuit obtains power from a transmission line different from a transmission line having a largest number of the single-line circuits connected thereto among the transmission lines.

* * * * *